United States Patent
Ishikawa et al.

(10) Patent No.: US 6,756,542 B2
(45) Date of Patent: Jun. 29, 2004

(54) FRONT-COVER ASSEMBLY AND INFORMATION APPARATUS HAVING THE SAME

(75) Inventors: Masaki Ishikawa, Kawasaki (JP); Tsutomu Konno, Kawasaki (JP); Hiroyuki Fujita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/282,009

(22) Filed: Oct. 29, 2002

(65) Prior Publication Data

US 2003/0047341 A1 Mar. 13, 2003

Related U.S. Application Data

(63) Continuation of application No. PCT/JP00/02892, filed on May 2, 2000.

(51) Int. Cl.[7] ................................................. H02G 3/14
(52) U.S. Cl. .......................... 174/66; 174/67; 220/241; 220/242
(58) Field of Search ...................... 174/66, 67; 220/241, 220/242

(56) References Cited

U.S. PATENT DOCUMENTS 3,610,884 A * 10/1971 Evans et al. ................. 219/439
6,133,843 A * 10/2000 Davidson .................. 340/693.9
6,518,500 B1 * 2/2003 Huang .......................... 174/50
6,519,208 B2 * 2/2003 DeVries ....................... 368/10
6,527,135 B1 * 3/2003 Braun et al. ............... 220/4.02

FOREIGN PATENT DOCUMENTS

| JP | 6-54371 | 7/1994 |
| JP | 3034254 | 11/1996 |
| JP | 8-291667 | 11/1996 |
| JP | 9-283942 | 10/1997 |

* cited by examiner

*Primary Examiner*—Dhiru R Patel
(74) *Attorney, Agent, or Firm*—Staas & Halsey LLP

(57) ABSTRACT

A front-cover assembly having a front-cover forming the front face of the information apparatus, lid members provided on the front-cover so as to be turned and moved between the closed position and the opened position, and caps provided on the upper and the lower face of the front-cover to hide the flanges of the lid members. The lid member is constituted by an elongated lid body and flanges provided on each end of the lid body. The flange has a turning center through-hole at the center, and a raised part as well as an outline part on the periphery part. On the upper face of the front-cover are formed a shaft part and concave parts. When the lid member is turned to the opened position, the raised part engages the concave part and is click locked, and the outline part appears on the front face of the front-cover filling the gap between the front-cover and the cap.

27 Claims, 18 Drawing Sheets

FIG. 7A
FIG. 7B
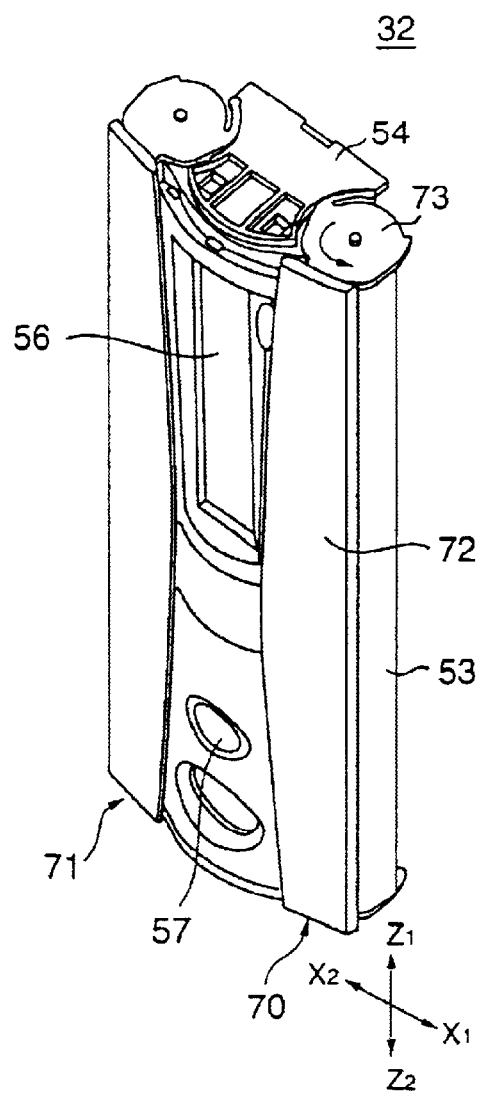
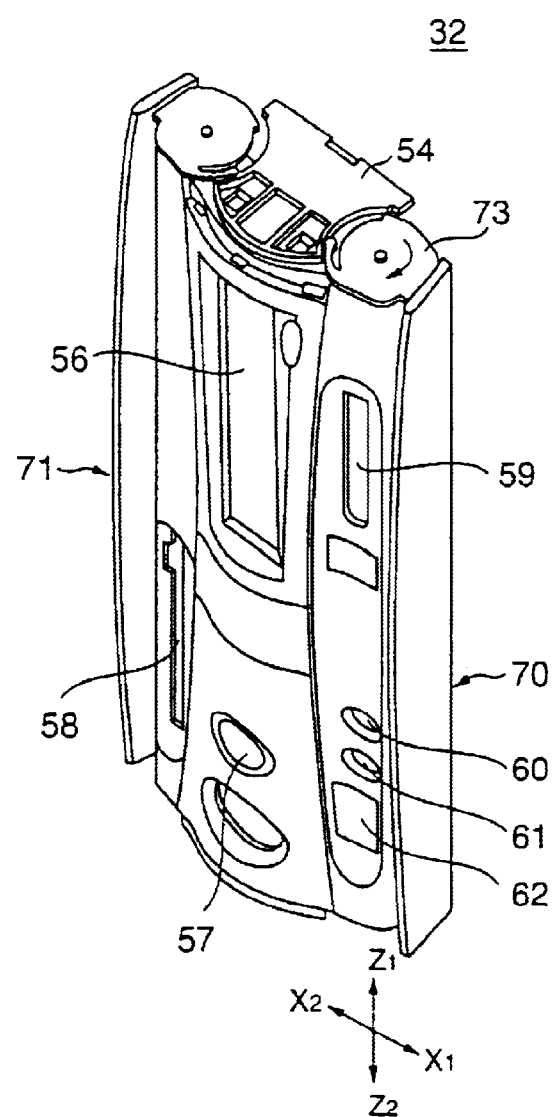

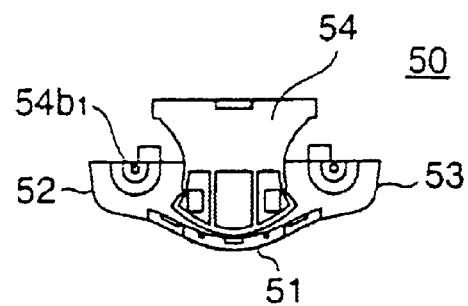
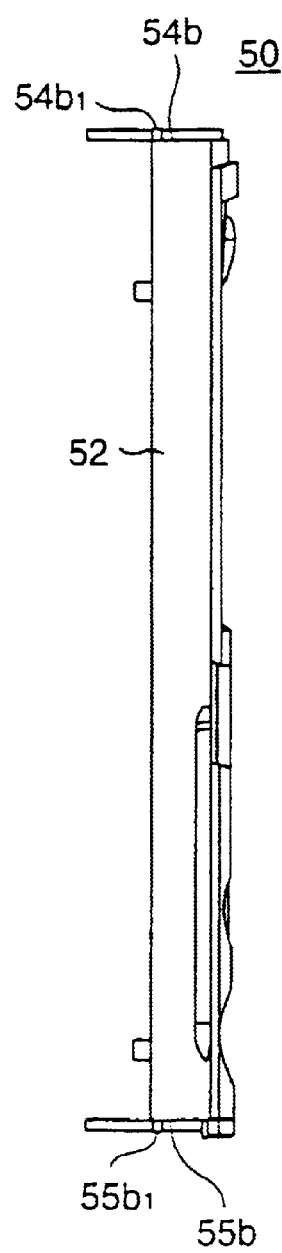
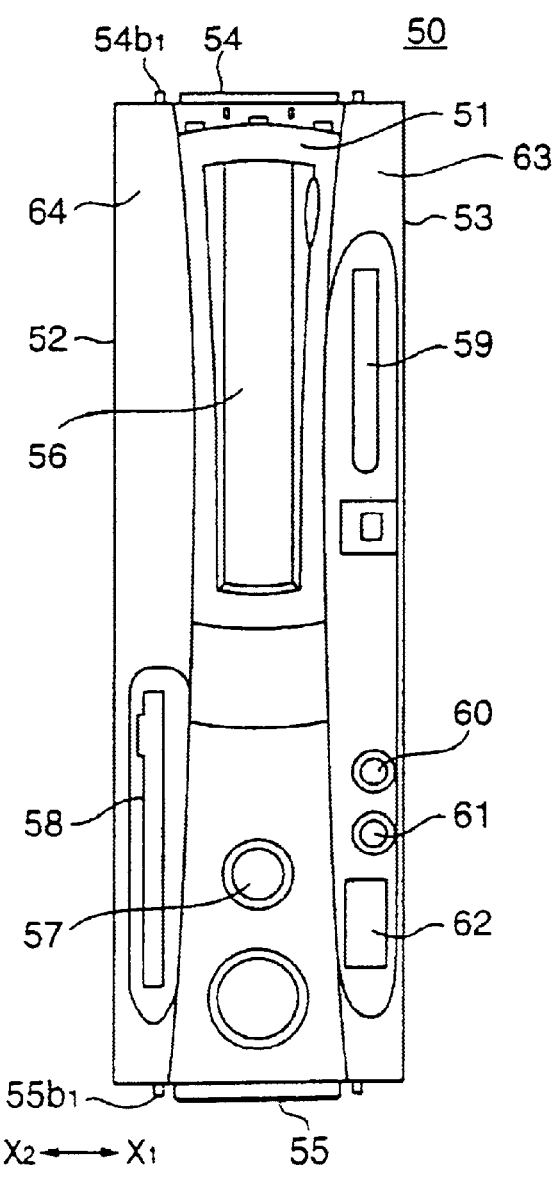

FIG. 11C
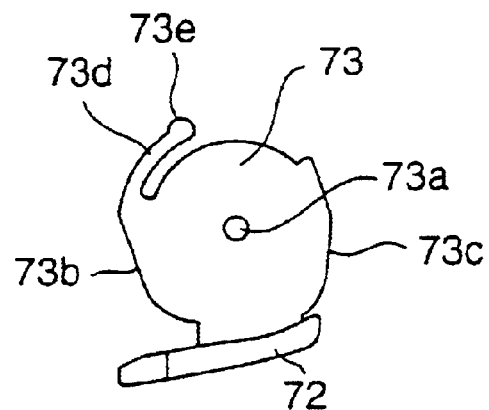
FIG. 11B
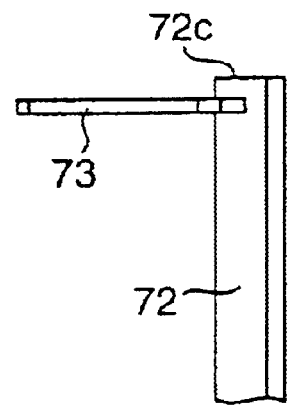
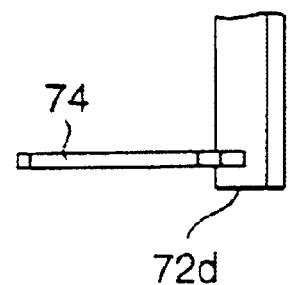
FIG. 11A
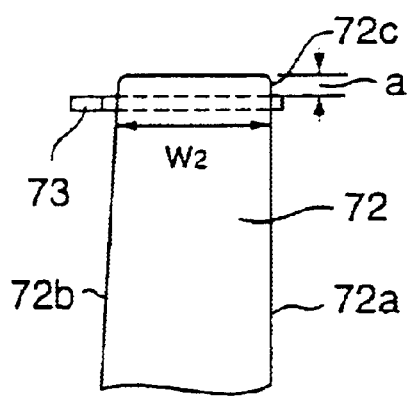
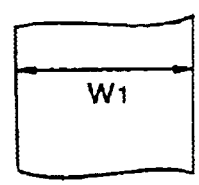
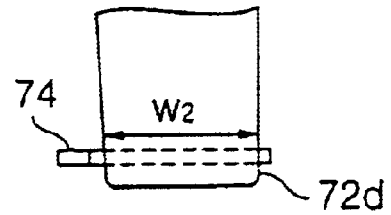

FRONT-COVER ASSEMBLY AND INFORMATION APPARATUS HAVING THE SAME

CROSS-REFERENCE TO RELATED APPLICATIONS

This is a continuation of Application PCT/JP00/02892, filed May 2, 2002.

BACKGROUND OF THE INVENTION

1. Field of the Invention

The present invention relates to a front-cover assembly for an information apparatus and an information apparatus having the same.

For the information apparatuses of personal computers and the like placed on a table to be used, an easy to use configuration and a pleasant design are required.

2. Description of the Related Art

FIG. 1A and FIG. 1B show the conventional information apparatus 10. The information apparatus 10 is configured to be easily usable with each type of terminal provided on the front face, and at the same time, is configured to cover the terminals 11 with lid members 12 and 13 when not in use to take the outer appearance into account. The information apparatus 10 has a housing 15 and a front-cover assembly 16 on the front side, is set on a pedestal 17, and placed height-wise on the table to be used. The front-cover assembly 16 has a front-cover 18, and the lid members 12 and 13 attached on left and right sides, respectively, of the front-cover 18 so as to be opened and closed. The front-cover 18 and the lid members 12 and 13 are molded components of synthetic resin.

When the information apparatus 10 is not in use, the lid members 12 and 13 are closed and the terminals 11 are hidden, as shown in FIG. 1A. When the information apparatus 10 is in use, the lid members 12 and 13 are turned and opened and the terminals 11 are exposed, as shown in FIG. 1B. The task of connecting the plugs to the terminals 11 is carried out from a front side of the information apparatus 10, and the information apparatus is easy to use. In addition, an operation of opening the lid members 12 and 13 is carried out by a user hooking and pulling the lid members 12 and 13 with fingertips of the user.

The lid member 12 has, as shown in FIG. 2, a lid body 12a, arm parts 12b and 12c projecting from a vicinity of opposite ends of the lid body 12a, and an engaging convex part 12d. The arm parts 12b and 12c have C-shaped bearing parts 12b1 and 12c1 on the leading ends thereof.

In correspondence to an above shape of the lid member 12, the front-cover 18 has, on a front face 18a, an opening 18b through which the arm 12b enters, an opening 18c through which the arm part 12c enters, an opening 18d through which the engaging convex part 12e enters, and also shaft parts 18e and 18f in an inner part of the openings 18b and 18c. On an inner circumference of the opening 18d, a concave part 18d1 is formed.

The lid member 12, as shown in FIG. 1B, is turnably attached with respect to the shaft parts 18e and 18f with the arm parts 12b and 12c in the respective openings 18b and 18c, and the C-shaped bearing parts 12b1 and 12c2 fitted to the respective shaft parts 18e and 18f. A size of the openings 18b and 18c are a size corresponding to a range of movement of the arm parts 12b and 12c when the lid member 12 is being opened or is being closed. The lid member 12 is, in the opened state, clickly locked with the engaging convex part 12d resiliently fitted to the convex part 18d1.

The shape of the other lid member 13 and a relationship with the front-cover 18 are the same as those for the lid member 12 described above.

No problem arises when the lid members 12 and 13 are in the closed state, as shown in FIG. 1A, but when they are turned and in the opened state, as shown in FIG. 1B, a plurality of openings 18b and 18d for attachment of the lid members 12 are exposed and furthermore, the arm parts 12b and 12c as well as the engaging convex part 12d are exposed, making the design unattractive.

Furthermore, when assembling the front-cover assembly 16 in a factory, an attachment of the lid members 12 and 13 to the front-cover 18 is, as shown in FIG. 3, done by pushing the C-shaped bearing part 12b1 (12c1) hard into the shaft part 18e (18f) as depicted with an arrow A, resiliently widening the C-shaped bearing part 12b1 (12c1) once and then fitting them to the shaft part 18e (18f). In order for the attached lid members 12 and 13 to not easily detach, the C-shaped bearing parts 12b1 and 12c1 are made thick and strong, making the task of attaching the lid members 12 and 13 to the front-cover 18 in the factory difficult. Since the task of pushing and fitting the bearing part 12b1 (12c1) to the shaft part 18e (18f) is carried out by holding the lid body 12a in hand, force is applied to a root of the arm parts 12b and 12c with respect to the lid body 12a and there is a risk of the arm parts 12b and 12c breaking.

Furthermore, the engaging convex part 12e is provided in a middle of the lid body 12a in a longitudinal direction, and when the lid body 12a is deflected, a position of the engaging convex part 12d is influenced by a deflection of the lid body 12a and is displaced. Therefore, a turning position of the lid member 12 when the lid member 12 is clickly locked readily varies.

SUMMARY OF THE INVENTION

It is a general object of the present invention to provide an improved front-cover assembly that overcomes the conventional problems mentioned above and to provide an information apparatus having the same.

A more specific object of the present invention is to provide a front-cover assembly in which, even if the front-cover is formed so as to have corner parts angularly projecting in the left and the right sides between the front face and the side face, the turning lid member can move without touching the corner part.

In order to achieve the above objects, the present invention has a lid member attached to the front-cover of the information apparatus so as to be opened and closed, so that the orientation with respect to the flange of the lid body is defined by having the distance between the turning center and the leading head in the turning direction when closing be different from the distance between the turning center to the leading head in the turning direction when opening.

By defining the orientation with respect to the flange of the lid body to an angle shifted in the direction of the tangent line when closing the lid member, the portion of the lid body on the side of the leading head along the turning direction moves away from the turning center and moves outside of the corner part having an angular shape.

A more specific object of the present inventin is to provide a front-cover assembly in which the lid member is click locked accurately in the closed position and the opened position.

In order to achieve this object, the present invention forms the raised part for click lock of the lid member on the periphery portion of the flange of the lid member attached to the front-cover of the information apparatus so as to be opened and closed, and engages the raised part to the concave part of the front-cover.

With such configuration, the position of the raised part is not shifted even if the lid body is deflected, and the raised part is not influenced by the deflection of the lid body. Thus, the click lock is carried out accurately when the lid member is in the closed position and the opened position.

A more specific object of the present invention is to provide a front-cover assembly capable of having a more sophisticated design when the lid member is in the opened state and the closed state.

In order to achieve this object, the present invention configures the shape of the flange of the lid member attached to the front-cover of the information apparatus so as to be opened and closed to correspond to the shape of the front-cover.

When the lid member is in the opened state, the flange blocks the gap between the front-cover and the cap making the above gap unnoticeable, and thus the design seen from the front face of the front-cover assembly is more sophisticated. Similarly, when the lid member is in the closed state, the flange blocks the gap between the front-cover and the cap making the above gap unnoticeable and thus the design seen from the side of the front-cover assembly is more sophisticated.

BRIEF DESCRIPTION OF THE DRAWINGS

Other objects, features and advantages of the present invention will become more apparent from the following detailed description when read in conjunction with the accompanying drawings, in which:

FIG. 7A and FIG. 7B are diagrams showing the opened and the closed state of the lid member;

FIG. 8A, FIG. 8B and FIG. 8C are diagrams showing the front-cover;

FIG. 11A, FIG. 11B and FIG. 11C are diagrams showing the lid member;

FIG. 14A, FIG. 14B and FIG. 14C are diagrams showing the lid member in the closed state, opened state, and the state in between;

DESCRIPTION OF THE PREFERRED EMBODIMENTS

Figure 1A:
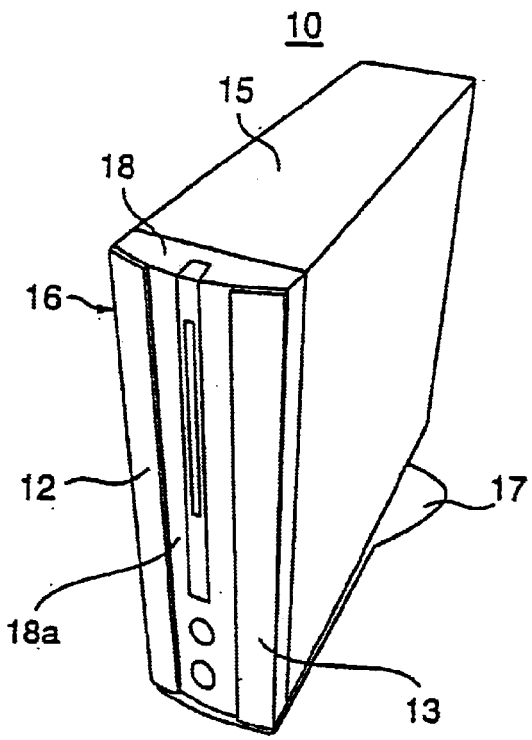
FIG. 1A and FIG. 1B are diagrams showing a conventional information apparatus.
Figure 1B:
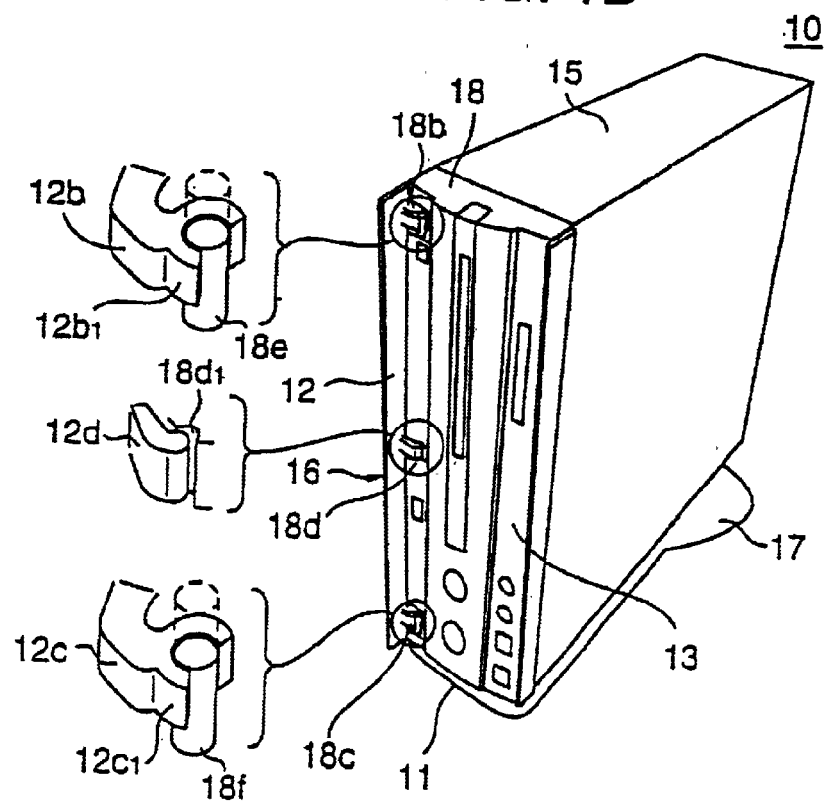
Figure 2:
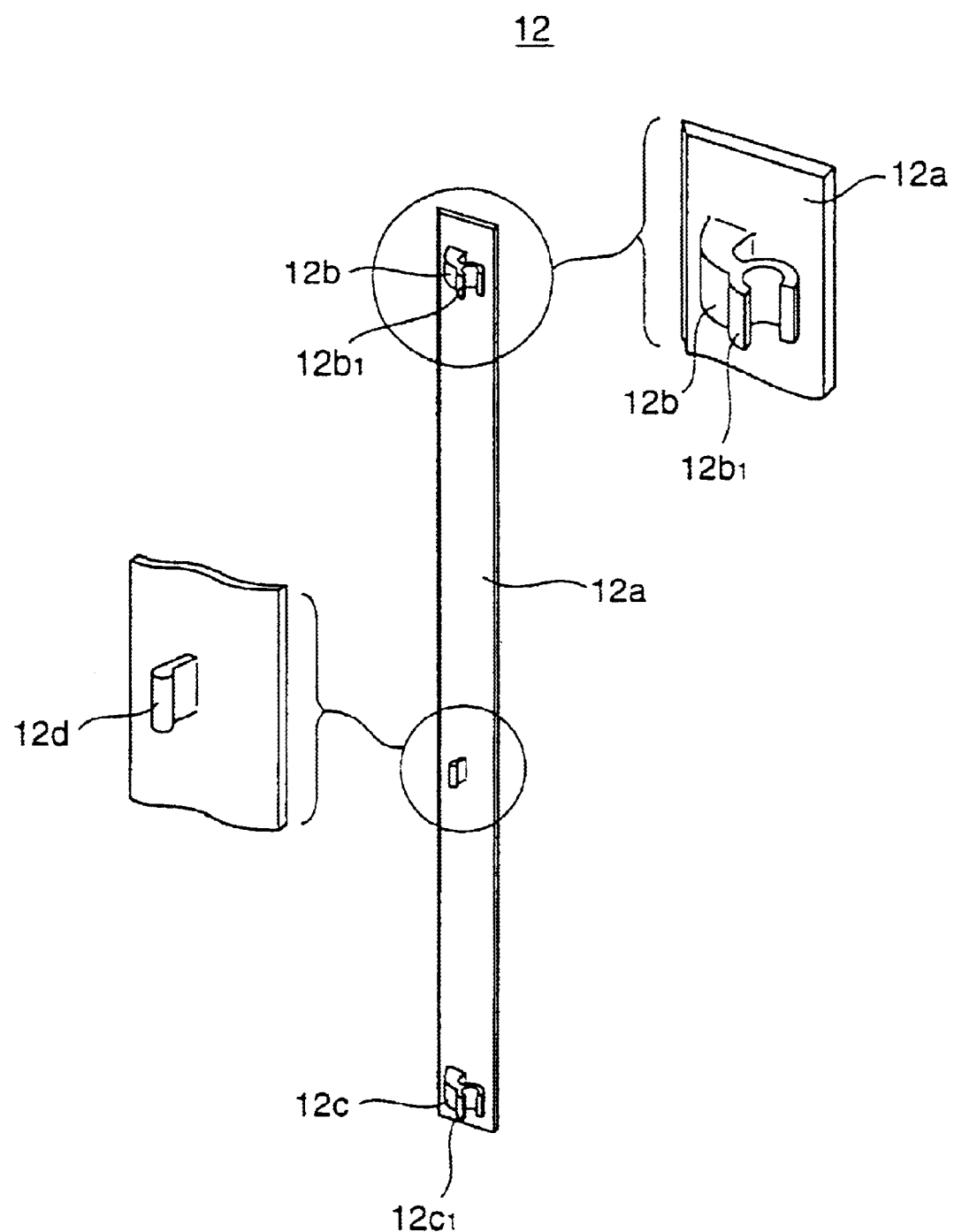
FIG. 2 is a diagram showing a lid member.
Figure 3:
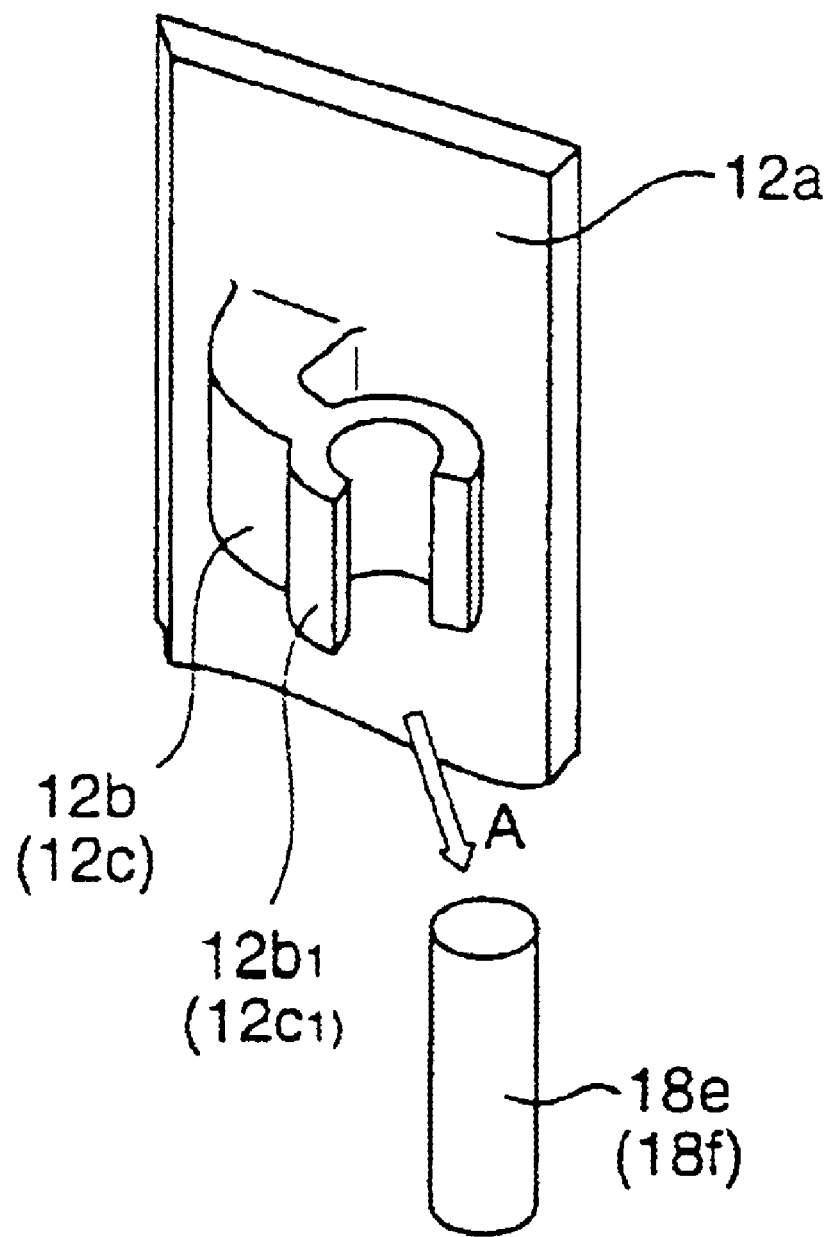
FIG. 3 is a diagram showing the attachment of the lid member.
Figure 4A:
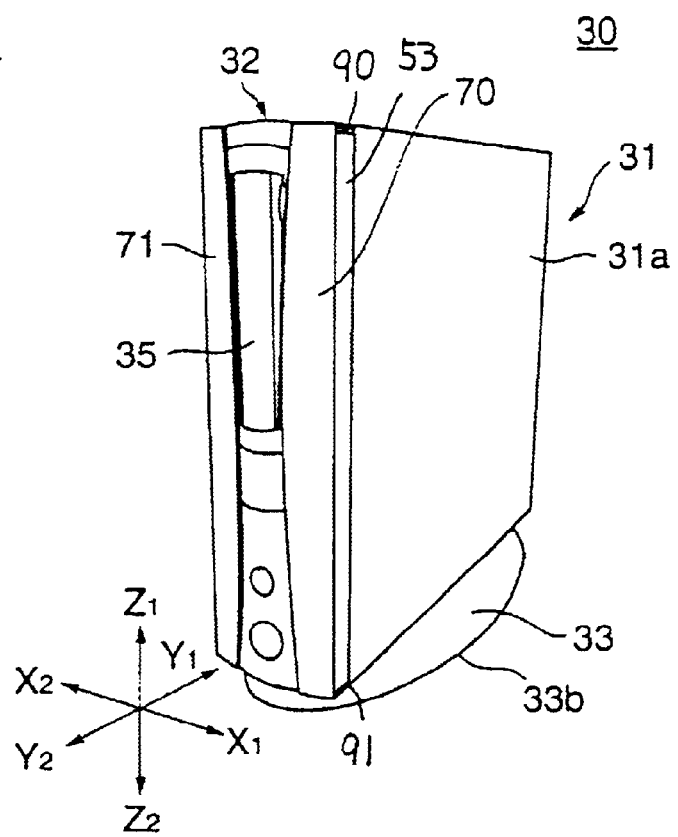
FIG. 4A and FIG. 4B are diagrams showing an information apparatus according to one embodiment of the present invention.
Figure 4B:
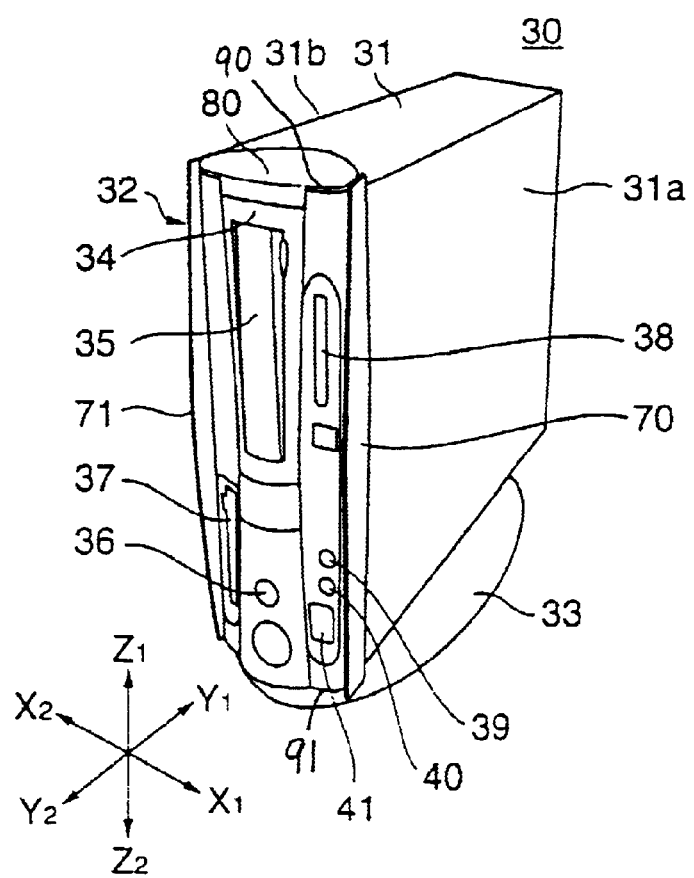
Figure 5:
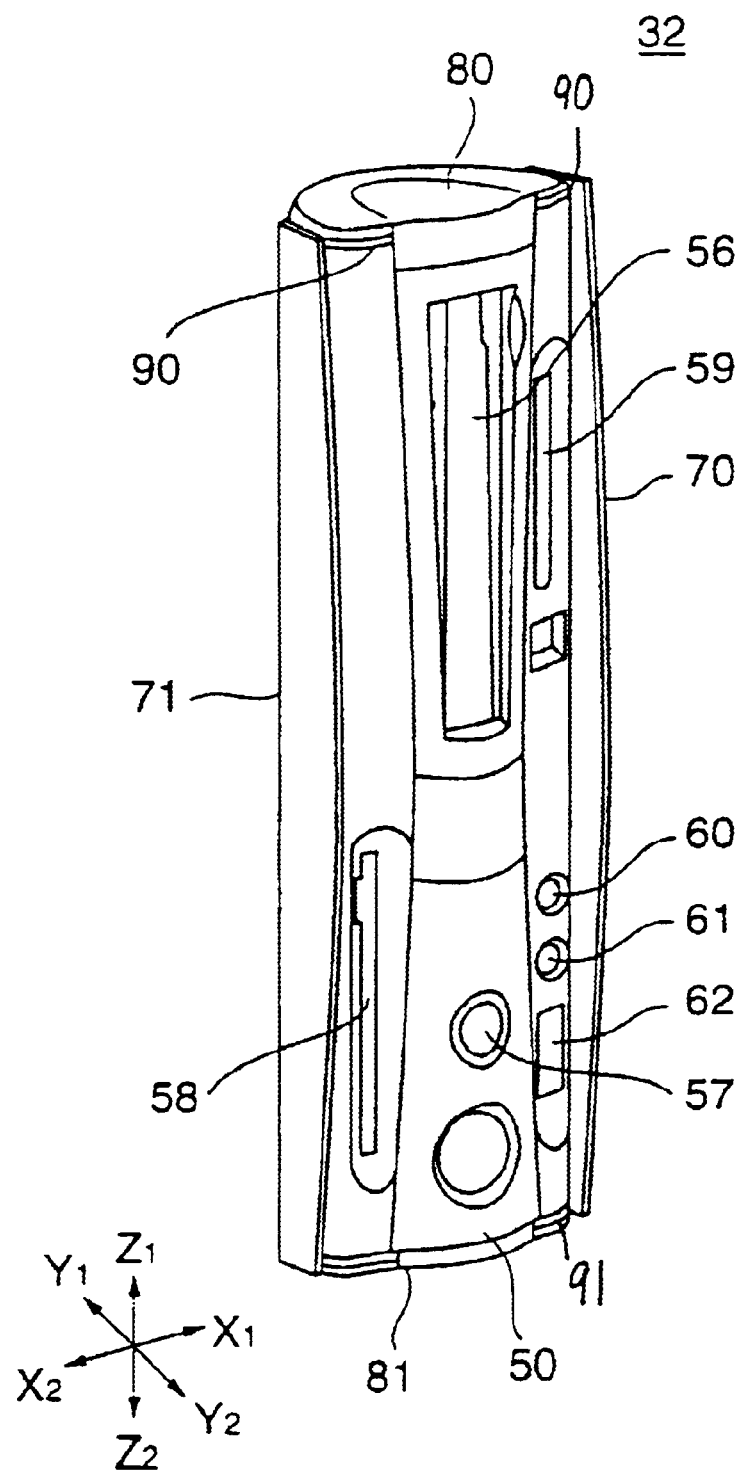
FIG. 5 is a perspective view of a front-cover assembly according to one embodiment of the present invention.

FIG. 4A and FIG. 4B show the information apparatus 30 according to one embodiment of the present invention. FIG. 4A and FIG. 7A show the lid members 70 and 71 in the closed state i.e., a closed position), and FIG. 4B, FIG. 5 and FIG. 7B show the lid members 70 and 71 in the opened state (i.e. open position).

First, the information apparatus 30 will be explained schematically. The information apparatus 30 has a box-shaped housing 31 and a front-cover assembly 32 on a front side, is set on a pedestal 33, and placed height-wise on a table to be used. The information apparatus 30 has, in a middle of the left and right directions, a CD-ROM slot-in drive 35 in an upright position and a power switch 36; at a position slightly to the left side (X2 direction side) of the front face 34, a floppy disk drive 37 in the upright position; and at a position slightly to the right side (X1 direction side) of the front face 34, a PC card slot 38, a microphone terminal 39, a headphone terminal 40, and a USB terminal 41 as shown from the top. When the information apparatus 30 is not in use, as shown in FIG. 4A and FIG. 7A, the lid members 70 and 71 are closed. The lid member 70 covers the PC card slot 38, the microphone terminal 39, the headphone terminal 40, and the USB terminal 41; the lid member 71 covers the floppy disk drive 37, and thus an outer appearance is more sophisticated. To use the information apparatus 30, the lid members 70 and 71 are turned and opened manually, as shown in FIG. 4B, FIG. 5 and FIG. 7B. Therefore, the floppy disk drive 37, the PC card slot 38, the microphone terminal 39, the headphone terminal 40, and the USB terminal 41 become exposed. A task of connecting the plugs to the microphone terminal 39, the headphone terminal 40, and the USB terminal 41 can be carried out from the front side of the information apparatus 30 and thus the information apparatus 30 has an easy to use configuration.

Figure 6:
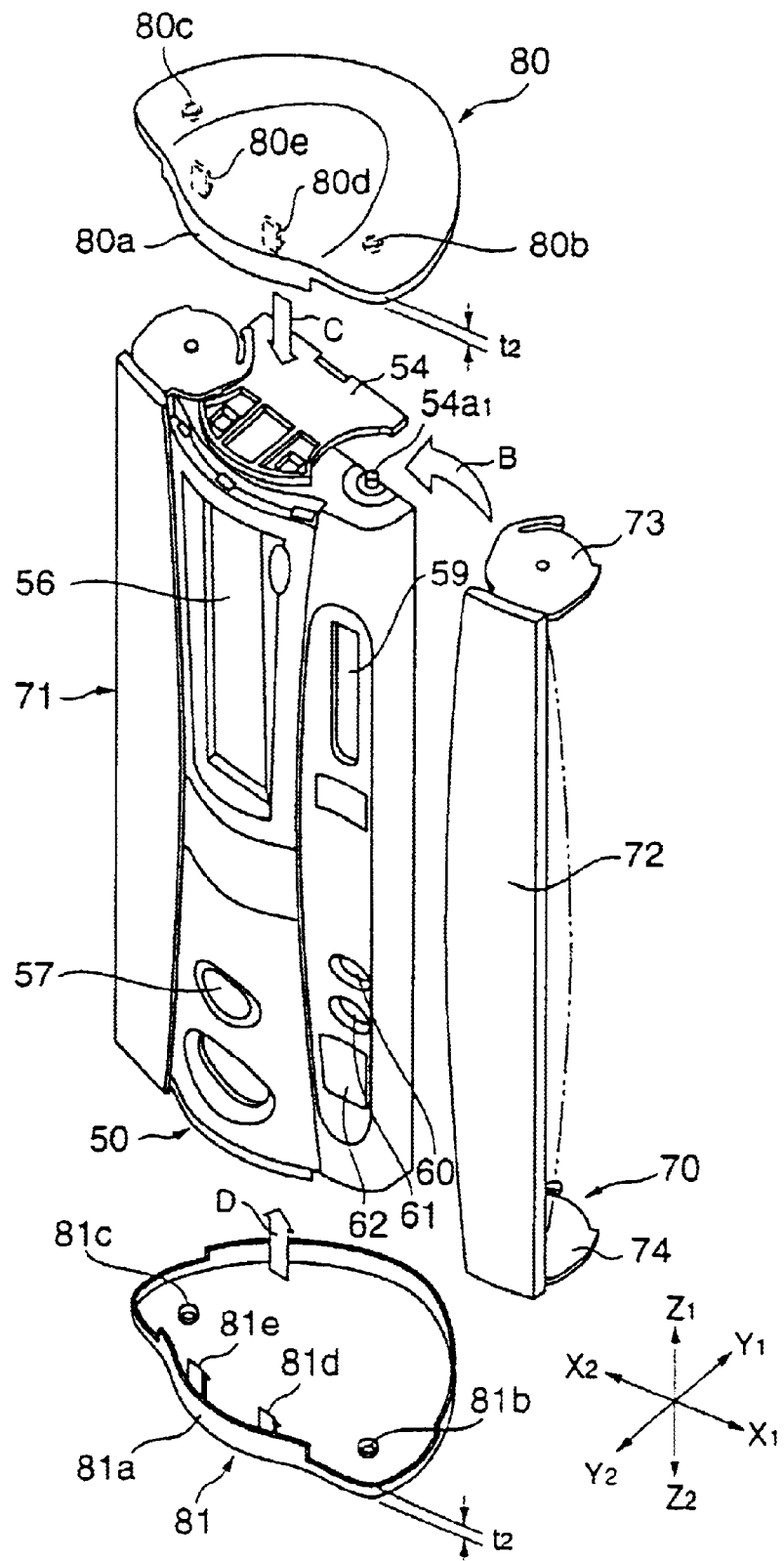
FIG. 6 is an exploded perspective view of the front-cover assembly of FIG. 5.

Next, the front-cover assembly 32 will be explained. The front-cover assembly 32 has a front-cover 50, lid members 70, 71 that can be opened and closed attached on the left and right side of the cover 50, an upper side cap member 80 attached on an upper face of the front-cover 50, and a lower side cap member 81 attached on a lower face of the front-cover 50, as shown in FIG. 5 and FIG. 6. The front-cover 50, the lid members 70, 71, the upper side cap member 80, and the lower side cap member 81 are all molded components of synthetic resin.

As shown in FIG. 8A, FIG. 8B and FIG. 8C, the front-cover 50 has, in addition to a substantially rectangular body part 51, a left side wall part 52, a right side wall part 53, an upper side wall part 54, and a lower side wall part 55 surrounding the substantially rectangular body part 51. The front-cover 50, when seen from a back side, has a shallow box shape and a high strength.

On the substantially rectangular body part 51, there are provided an opening for a CD-ROM slot-in drive 56, an opening for a power switch 57, an opening for a floppy disk drive 58, an opening for a PC card slot 59, an opening for a microphone terminal 60, an opening for a headphone terminal 61, and an opening for a USB terminal 62.

Figure 9A:
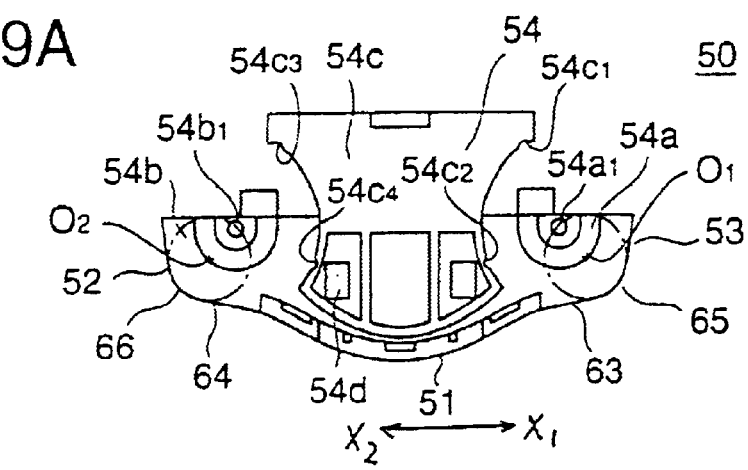
FIG. 9A, FIG. 9B and FIG. 9C are enlarged views showing the front-cover.
Figure 9B:
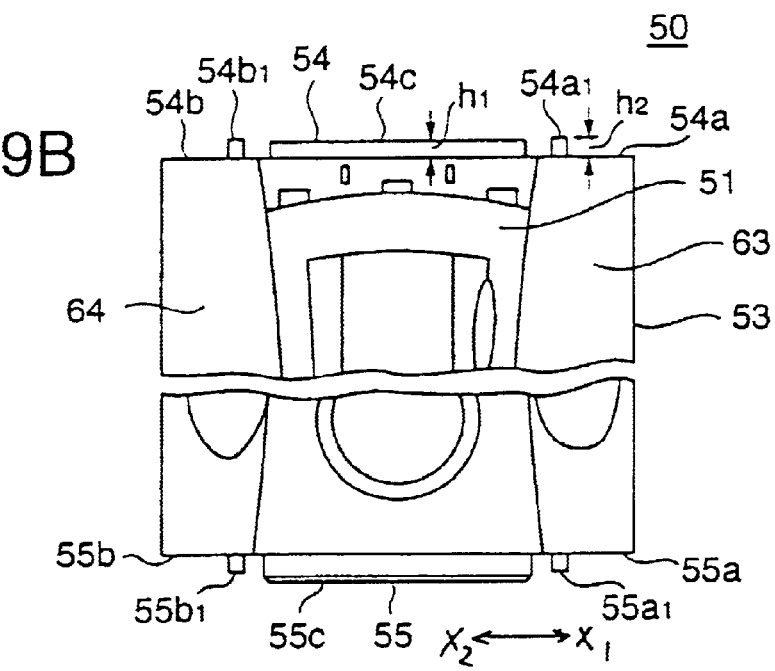
Figure 9C:
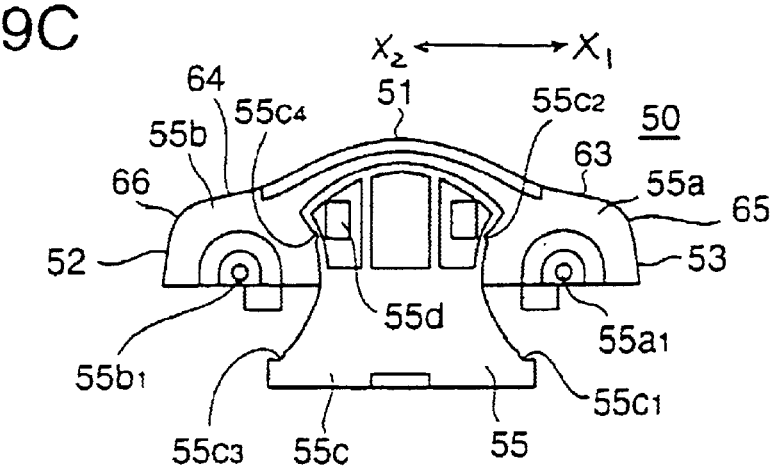
Figure 10:
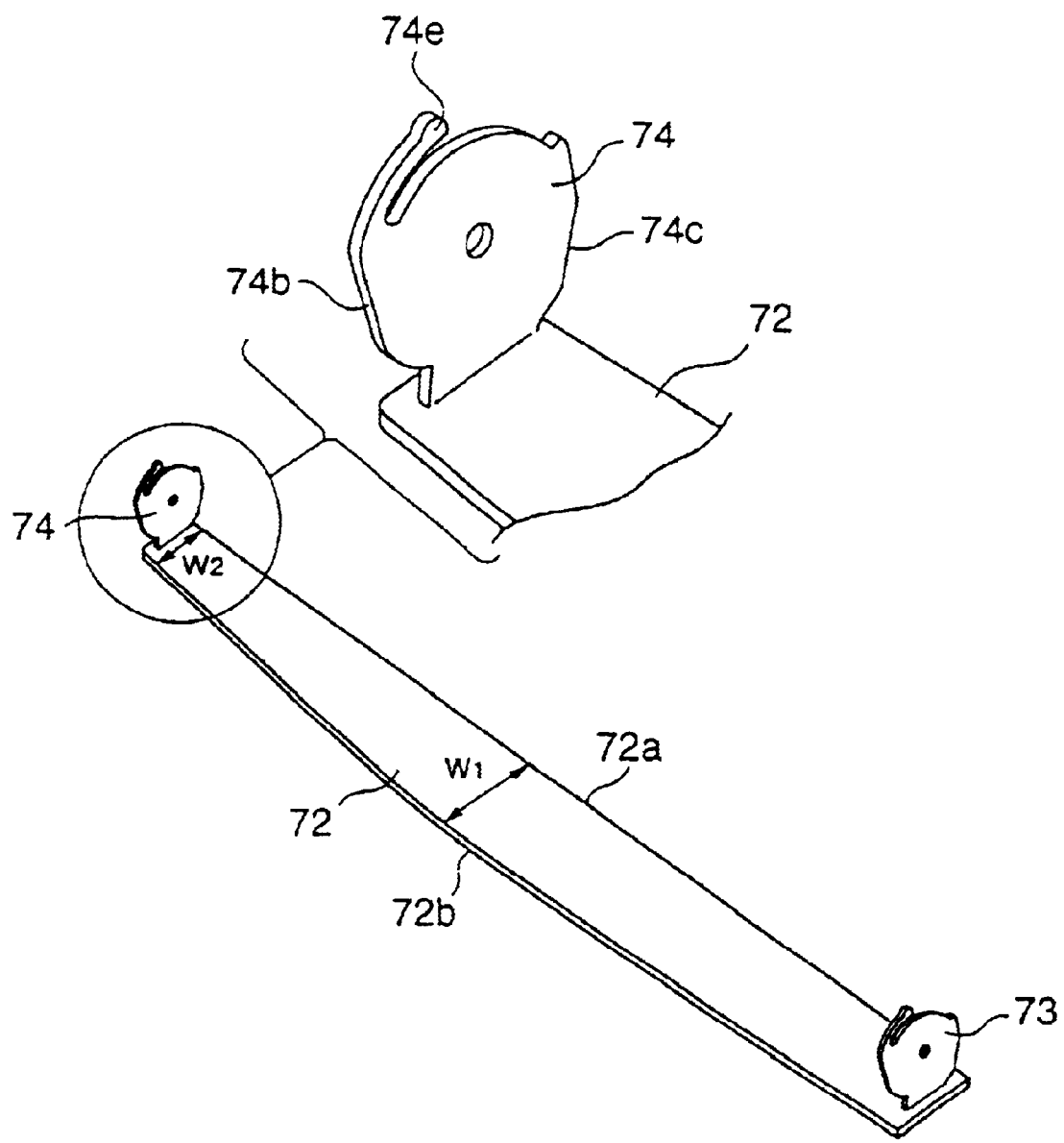
FIG. 10 is a perspective view of the lid member.

As is also shown enlarged in FIG. 9A, FIG. 9B and FIG. 9C, the substantial rectangular body part 51 has, on the X1 side, a lid covered face 63 covered by the closed lid member 70 and on the X2 side, a lid covered face 64 covered by the closed lid member 71. The X1 side of the front-cover 50 has a continuous form of lid covered face 63—circular segment face 65—right side wall part 53. The X2 side of the front-cover 50 has a continuous form of lid covered face 64—circular segment face 66—left side wall part 52. The circular segment face 65 forms part of a periphery of a cylinder having a center at point O1. The point O1 is positioned slightly toward the circular segment face 65 from a shaft part 54a1 described hereinafter, and in substantially a middle of the shaft part 54a1 and the circular segment face 65. Similarly, the circular segment face 66 forms part of a cylinder having a center at point O2, positioned slightly toward the circular segment face 66 from a shaft part 54b1 described hereinafter. The circular segment face 65 and the circular segment face 66 form corner parts of the left and the right side of the front-cover 50. The corner part (circular segment face 65) on the X1 direction side of the front-cover 50 is positioned so that a distance between the shaft part 54a1 and the circular segment face 65 is longer than a distance between the shaft part 54a1 and the lid covered face 63, as well as a distance between the shaft part 54a1 and the right side wall part 53. This also holds for the corner part (circular segment face 66) on the X2 direction side. That is, the corner parts 65 and 66 of the front-cover 50 are angularly projected to the left side and the right side, and a design of the front-cover 50 is favorable.

The right side wall part 53 is substantially planar and a relationship with the housing 31 is that, as shown in FIG. 4A and FIG. 4B, it is present at an extended position from a side face 31a of the housing 31, and a relationship with the lid member 70 is that it is covered by the lid member 70 in the opened state.

The left side wall part 52 is substantially planar and a relationship with the housing 31 is that, as shown in FIG. 4A and FIG. 4B, it is present at an extended position from a side face 31b of the housing 31, and a relationship with the lid member 71 is that it is covered by the lid member 71 in the opened state.

The upper side wall part 54 has flange supporting parts 54a and 54b on the left and the right sides, and has a convex shaped step part 54c between the flange supporting parts 54a and 54b. The convex shaped step part 54c has a height h1, being the same as a thickness t1 of the flange 73 explained below. On the flange supporting parts 54a and 54b, shaft parts 54a1 and 54b1 are formed. A height h2 of the shaft parts 54a1 and 54b1 is slightly larger than the thickness t1 of the flange 73. Of the convex shaped step part 54c, a part facing the flange supporting part 54a is formed with concave parts 54c1 and 54c2 to click lock, and of the convex shaped step part 54c, a part facing the flange supporting part 54b is formed with concave parts 54c3 and 54c4 to click lock.

As shown in FIG. 9C, the lower side wall part 55 has the same configuration as the above upper side wall part 54, and has flange supporting parts 5 and 55b, shaft parts 55a1 and 55b1, a convex shaped step part 55c, and concave parts 55c1, 55c2, 55c3 and 55c4 for click locking FIG. 10, FIG. 11A, FIG. 11A, FIG. 11C, FIG. 12A, FIG. 12A, FIG. 12C show the lid member 70. The lid member 70 includes lid body 72 of an elongated board-like form and flanges 73 and 74 located near opposite ends of the lid body 72; and thus has a substantially angular C letter shape.

The lid body 72 has a linear edge 72a, and a substantially circular segment edge 72b; a width of a central part thereof, being a maximum, is w1 and is wider than a width w2 of opposite ends thereof. The lid body 72 has stick-out parts 72c and 72e that stick further out beyond a position of the flanges 73 and 74. The stick-out parts 72c and 72d have dimension a, that corresponds to a thickness t2 of the upper side cap member 80 and the lower side cap member 81, respectively.

Figure 12A:
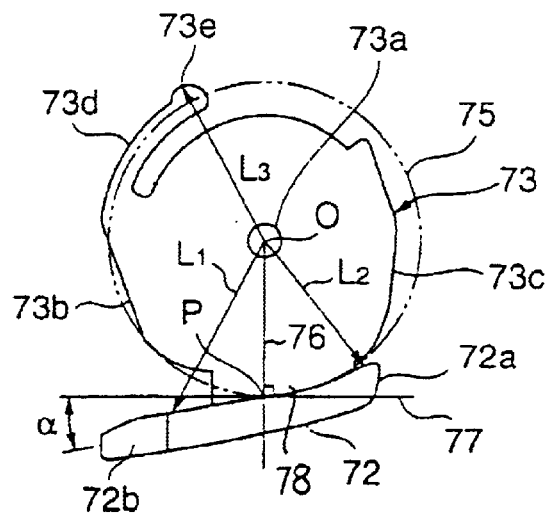
FIG. 12A FIG. 12B and FIG. 12C are enlarged views showing flanges of the lid member.

In FIG. 12A, O is a center of the a turning center hole 73a of the flange 73, and P is a center position of a width of an end of the lid body 72. 75 is a circle having a center at O and a line segment OP as a radius 76. 77 is a line tangent to the circle 75 at point P.

The flange 73 has a deformed shape of the circle 75, has at the center thereof, the turning center hole 73a, or a through-hole, and at a periphery part, an outline part 73b, an outline part 73c, an arm 73d that extends along a periphery and has a spring property, and a raised part 73e at a leading end of the arm 73d.

In FIG. 12A, the outline part 73b is placed at a position shifted in a clockwise direction from the lid body 72. In FIG. 12A, the outline part 73c is placed at a position shifted in a counterclockwise direction from the lid body 72. The outline part 73b is formed so that the turning center hole 73a fits to the shaft Part 54a1, and the lid member 70 faces a front face of the front-cover 50 in the opened state, as shown in FIG. 4B; and has a shape corresponding to the contour of the lid covered face 63, so that a gap 90 between the substantially rectangular body part 51 and the upper side cap member 80 exposed when the lid member 70 is in the opened state is filled (see FIG. 19).

Figure 17:
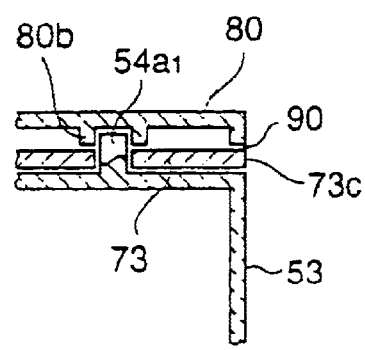
FIG. 17 is a sectional view taken along line XVII—XVII in FIG. 15.
Figure 18:
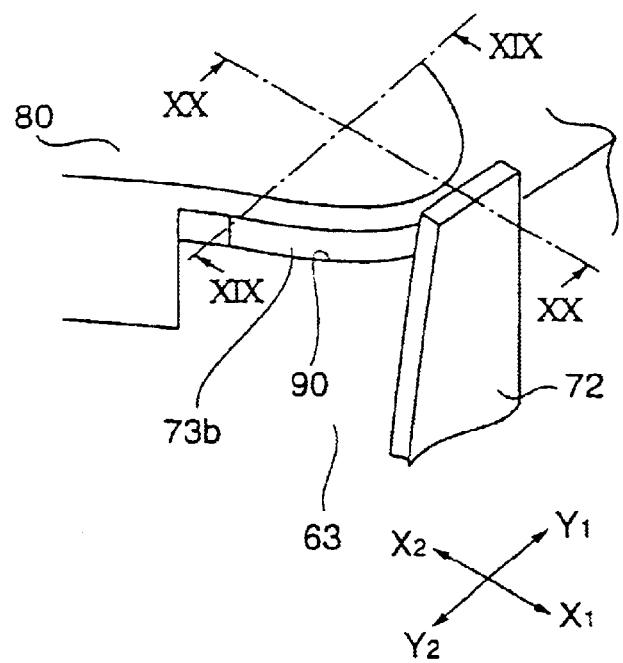
FIG. 18 is an enlarged view showing the lid member in the opened state.

When the lid member 70 is in the closed state as shown FIG. 4A, the outline part 73c faces the right side wall part 53 of the front-cover 50 and has a shape corresponding to a contour of the right side wall part 53, so that the gap 90 between the right side wall part 53 and the upper side cap member 80 exposed when the lid member 70 is in the closed state is filled (see FIG. 17).

The raised part 73e is formed as part of the flange 73, and even if the lid body 72 is deflected, the position with respect to the flange jointing portion 78 is not influenced. Furthermore, the raised part 73e is positioned on an outer periphery side of the flange 73 and a distance L3 from the turning center hole 73a is long. Therefore, a click lock operation is performed accurately at a time when the lid member 70 is turned to the closed state, and at a time when the lid member 70 is turned to the opened state.

Moreover, the arm 73d having the raised part 73e on the leading end extends along the periphery of the flange 73, and the length, shape and the like, now formed in an optimum state, can be relatively freely designed. The arm 73d now has an optimum spring property.

As can be recognized from the above, the lid member 70 is configured to have both an operation of turnably supporting the lid member 70 to the flange 73, and an operation of click locking the lid member 70 to the opened state and to the closed state.

Figure 12B:
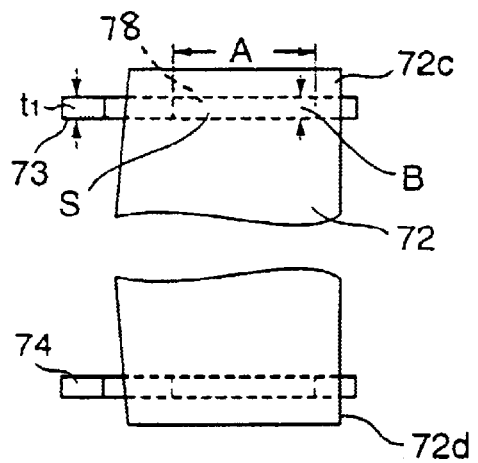
Figure 12C:
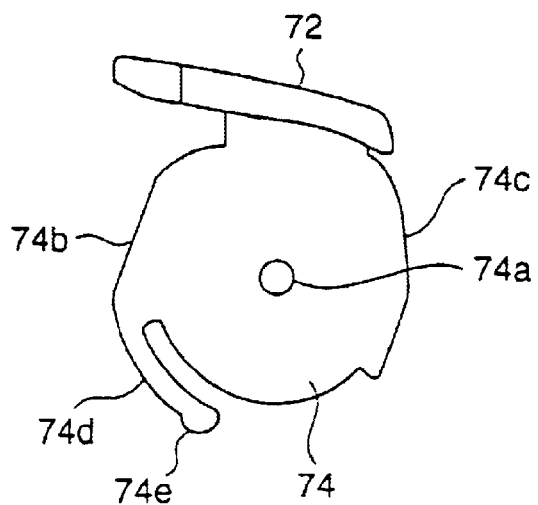

As shown in FIG. 12C, the flange 74 also has a turning center hole 74a, an outline part 74b, an outline part 74c, an arm 74d, and a raised part 74e, as with the flange 73.

Referring again to FIG. 12A, the lid body 72 is oriented slanted at an angle α in the counterclockwise direction with respect to the above tangent line 77. That is, as the lid body 72 is shifted in the clockwise direction from a line segment OP, a distance from the center O becomes greater. In other words, the lid body 72 is further away from the center a of the side to be the leading head when being closed, i.e., side of the edge 72b. The lid body 72 is oriented slanted with respect to the tangent line 77 so that when the lid member 70 is being opened or closed, the lid body 72 moves outside of the circular segment face 65 angularly projected, and does not touch the circular segment face 65.

In addition, depending on the shape of the front-cover, the orientation of the lid body 72 with respect to the flange 73 may be the opposite of above, i.e., may be oriented so that the distance from the center O to the substantially circular segment edge 72b is shorter than a distance from the center O to the substantially circular segment edge 72a.

In FIG. 12B, the rectangular portion A×B shown with a broken line is the flange jointing portion 78 where the flange 73 is jointed to the lid body 72. The surface area S of the flange jointing portion 78 determines a strength of a joint of the flange 73 to the lid body 72. Here, the flange 73 is jointed across substantially an entire width of the lid body 72, and the dimension A is approximately the same as the width w2 mentioned above and is long. Therefore, the surface area S of the flange jointing portion 78 is large and a mechanical jointing strength of the flange 73 to the lid body 72 is high.

Since the dimension A is long, the dimension B is made small while still maintaining sufficient mechanical jointing strength of the flange 73 to the lid body 72. Since the dimension B is small, the flange 73 has the thickness t1, which is small. Since the thickness t1 of the flange 73 is small, the gap 90 between the upper side cap member 80 and the flange supporting part 54a is narrower.

The other lid member 71 is that in which the lid member 70 described above is turned upside down. Thus, the description thereof will be omitted. The lid member 70 and the lid member 71 are common components.

As shown in FIG. 6, the upper side cap member 80 has an outline part 80a corresponding to the substantially rectangular body part 51, the left side wall part 52, and the right side wall part 53 of the front-cover 50; a pair of tubular bearing parts 80b and 80c; and a pair of nail parts 80d and 80e to attach on the under face. By having the pair of nail parts 80d and 80e engaged to the holes 54d of the upper face of the front-cover 50 and attaching the upper side cap member 80, a gap 90, corresponding to the thickness t1 of the flange 73, is formed between the upper side cap member 80 and the flange supporting parts 54a and 54b (see FIG. 17). The gap 90 is formed with a range of movement of the flange jointing portion 78, being the root of the flange 73 to the lid body 72, when the lid member 70 is turned. In other words, the gap 90 is formed as a clearance to turn the lid member 70.

As shown in FIG. 6, the lower side cap member 81 also has an outline part 81a, a pair of tubular bearing parts 81b and 81c, and a pair of nail parts 81d and 81e, as with the upper side cap member 80.

Next, assembling of the front-cover assembly 32 will be explained.

As shown in FIG. 6, the front-cover assembly 32 is completed by attaching the lid members 70 and 71 to the front-cover 50, and then attaching the upper side cap member 80 and the lower side cap member 81.

The lid member 71 is, as shown with an arrow B, attached so as to have the turning center hole 73a of the flange 73 turnably fitted to the shaft part 54a1 and have the flange 73 supported by the flange supporting part 54a; to have the turning center hole 74a of the flange 74 on the opposite side turnably fitted to the shaft part 55a1 and have the flange 74 supported by the flange supporting part 55a; and to have the lid body 72 conform to the front-cover 50. In addition, the shaft part 54a1 passes through the turning center hole 73a and projects from the upper face of the flange 73, and the shaft part 55a1 passes through the turning center hole 74a and projects from the upper face of the flange 74.

The attachment of the lid member 70 is carried out by bending the lid body 72 as shown with a-chain double-dashed line in FIG. 6, making the flange 73 and the flange 74 bend outward, and increasing a distance between the turning center hole 73a and the turning center hole 74a. In other words, the attachment of the lid member 70 is carried out without forcedly bending the flange 73 and the flange 74 with respect to the lid body 72. Furthermore, because the lid member 70 is long, the amount the flanges 73 and 74 bend to be above the respective shaft parts 54a1 and 55a1 can be small, and the attachment of the lid member 70 is carried out without forcedly deforming the lid member 70. The other lid member 71 is attached in a manner similar to the lid member 70.

Figure 16:
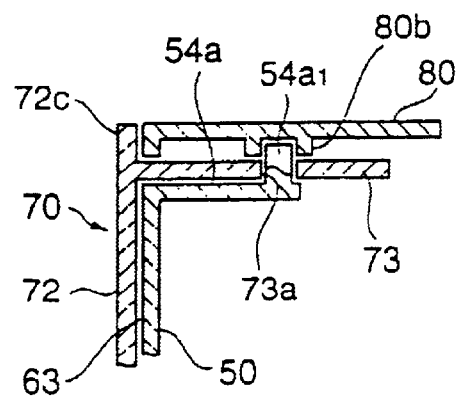
FIG. 16 is a sectional view taken along line XVI—XVI in FIG. 15.

The upper side cap member 80 is attached as shown in FIG. 16 and FIG. 17, by being pressed as shown with an arrow C, engaging the nail parts 80d and 80e to the hole 54d of the upper face of the front-cover 50 and covering the flange 73. Furthermore, as shown in FIG. 14B and FIG. 14C, the tubular bearing part 80b is fitted to, the shaft part 54a1, the portion projecting from the upper face of the flange 73. The other tubular bearing part 80c is fitted to, the shaft part 54b1, the portion projecting from the upper face of the flange 73.

The lower side cap member 81 is attached by being pressing as shown with an arrow D, engaging the nail parts 81d and 81e to holes 55d of the lower face of the front-cover 50 and covering the flange 74. The tubular bearing parts 81b and 81c are fitted to, the respective shaft parts 55a1 and 55b1, the portions projecting from the lower face of the flange 74.

The upper side cap member 80 and the lower side cap member 81 cover, for example, the flanges 73 and 74, thus making the design of the outer appearance of the front-cover assembly 32 more sophisticated. Furthermore, as shown in FIG. 16 and FIG. 17, the tubular bearing parts 80b, 80c, 81b, 81c fix the leading end side of the respective shaft parts 54a1, 55b1, 55a1, and 55b1, and the shaft parts 54a1, 54b1, 55a1 and 55b1 are reinforced.

The above front-cover assembly 32 is combined with the housing 31 to construct an outward form of the information apparatus 30.

Next, the opening and the closing operation and the movement of the lid members 70 and 71 in the information apparatus 30 will be explained.

The opening operation and the closing operation of the lid members 70 and 71 are performed by the user hooking and moving a part of the lid members 70 and 71 with a fingertip.

The lid member 70, as shown enlarged in FIG. 13, FIG. 14A, FIG. 14B, FIG. 14C, is turned approximately 90 degrees in the counter clockwise direction from the state shown in FIG. 7A to a state shown in FIG. 7B and opened, and on the contrary, is turned approximately 90 degrees in the clockwise direction from the state shown in FIG. 7B to a state shown in FIG. 7A and closed. In the opened state, the lid body 72 faces the right side wall part 53 of the front-cover 50.

Here, the lid member 70 is turned with the raised parts 73e and 74e sliding over a rim of the convex shaped parts 54c and 55c. Since the arm parts 74d and 75d are deflected and have spring force, the raised parts 73e and 74e press against the rim of the convex shaped step part 54c and 55c. When the raised parts 73e and 74e slide over the rim of the convex shaped step parts 54c and 55c, an appropriate resisting force is generated. Thus the operator can carry out the opening and the closing operation feeling a comfortable touch at the fingertips, and the information apparatus has a sophisticated look.

Now, the features concerning the opening and closing of the lid member 70 will be explained.

The front-cover 50 has the following features in relation to the opening and closing of the lid member 70.

1. The click lock operation is accurate.

The lid member 70, in the opened state, is clickly locked with the raised part 73e engaged to the concave part 54c1, and the raised part 74e to the concave part 55c1. The lid member 70, in the closed state, is clickly locked with the raised part 73 engaged to the concave part 54c2, and the raised part 74e to the concave part 55c2.

The raised parts 73e and 74e are formed as part of the respective flanges 73 and 74, and even if the lid body 72 is deflected, the position with respect to the flange jointing portion 78 is not influenced. Further, the raised parts 73e and 74e are positioned on the outer periphery side of the respective flanges 73 and 74, and the distance L3 from the turning center holes 73a and 74a is long. Furthermore, the concave parts for click locking 54c1, 54c2, 55c1 and 55c2 are formed on the upper side wall part 54 and the lower side wall part 55 of the front-cover 50. Thus, the click lock operation is carried out accurately at the time when the lid member 70 is turned to the closed state and at the time when the lid member 70 is turned to the opened state.

Moreover, because the click lock operation is carried out on both the upper and lower flanges 73 and 74, the lid member 70 is more stably held in the opened state and the closed state compared to a configuration in which only one of the flanges 73 or 74 is click locked.

2. The design seems sophisticated without any eyesores.

When the lid member 70 is in the closed state, as shown in FIG. 4A, FIG. 7A, FIG. 14A, FIG. 15, FIG. 16 and FIG. 17, the lid body 72 covers the right side portion of the substantially rectangular body part 51 of the front-cover 50. The stick-out parts 72c and 72d cover a right side portion of the upper side cap member 80 and the lower side cap member 81. Therefore, the upper side cap member 80 and the lower side cap member 81 also have a part thereof hidden and the design seen from the front seems sophisticated.

Figure 14A:
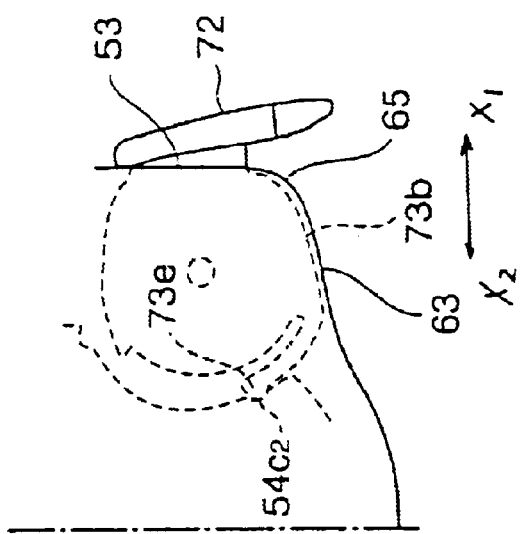
Figure 14B:
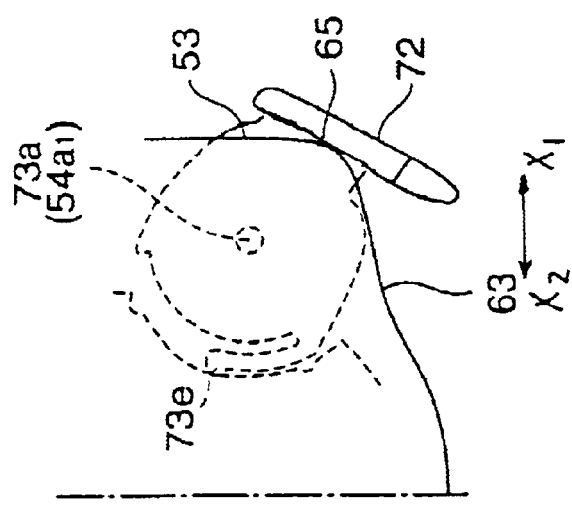
Figure 14C:
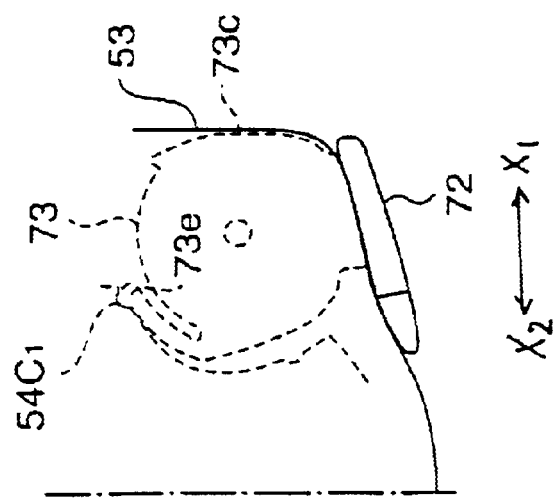
Figure 15:
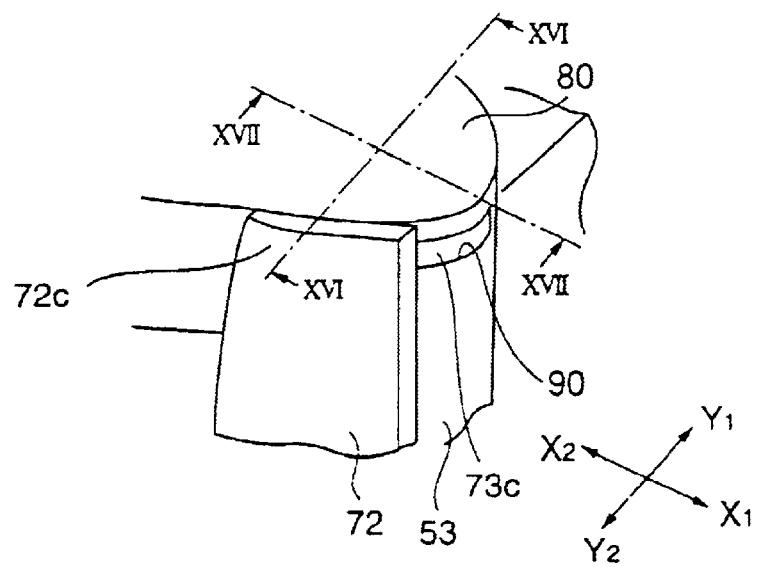
FIG. 15 is an enlarged view showing the lid member in the closed state.

As shown in FIG. 14A, FIG. 17, and FIG. 4A, regarding the right side wall part 53 of the front-cover 50 being exposed, the gap 90 between the upper side cap member 80 and the right side wall part 53 is blocked by the outline part 73c of the flange 73. Similarly, a gap 91 between the lower side cap member 81 and the right side wall part 53 is blocked by the outline part 74c of the flange 74. Furthermore, the gaps 90 and 91 are narrow. Thus, the gaps 90 and 91 are not noticeable and the design seen from the side seems sophisticated.

When the lid member 70 is in the opened state, as shown in FIG. 4B, FIG. 5, FIG. 7B, FIG. 14C, FIG. 18, FIG. 19 and FIG. 20, the lid body 72 covers the right side wall part 53 of the front-cover 50. The stick-out parts 72c and 72e cover the upper side cap member 80 and the lower side cap member 81. Therefore, the upper side cap member 80 and the lower side cap member 81 are also hidden and the design seen from the side seems sophisticated.

Figure 19:
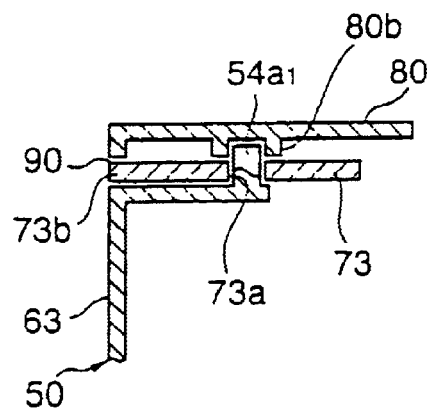
FIG. 19 is a sectional view taken along line XIX—XIX in FIG. 18.
Figure 20:
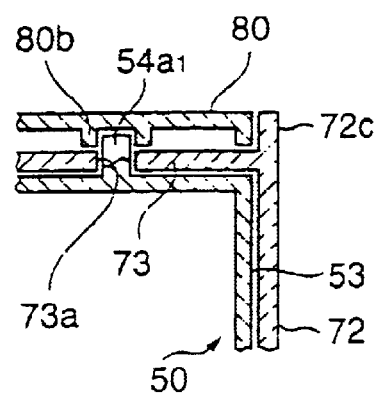
FIG. 20 is a sectional view taken along line XX—XX in FIG. 18.

As shown in FIG. 14A and FIG. 19, regarding the substantially rectangular body part 51 of the front-cover 50 being exposed, the gap 90 between the upper side cap member 80 and the substantially rectangular body part 51 is blocked by the outline part 73b of the flange 73. Similarly, the gap 91 between the lower side cap member 81 and the substantially rectangular body part 51 is blocked by the outline part 74b of the flange 74. Furthermore, the gaps 90 and 91 are narrow. Thus, the gaps 90 and 91 are not noticeable and the design seen from the front seems sophisticated.

3. The lid body 72 does not touch the circular segment face 65, being the projecting corner part of the front-cover 50.

The circular segment face 65 being the corner part of the front-cover 50 is protected.

As shown in FIG. 12A, the lid body 72 is oriented slanted at the angle α in the counterclockwise direction with respect to the tangent line 77. That is, as the lid body 72 shifts in the clockwise direction from the position of the line segment OP, the distance from the center O becomes greater. In other words, the lid body 72 is positioned so that the distance L1 from the center O of the side to be the leading head when closing, i.e., the side of the edge 72b, is longer than the distance L2 from the center O of the side to be the leading head when opening, i.e., side of the side 72a.

Figure 13:
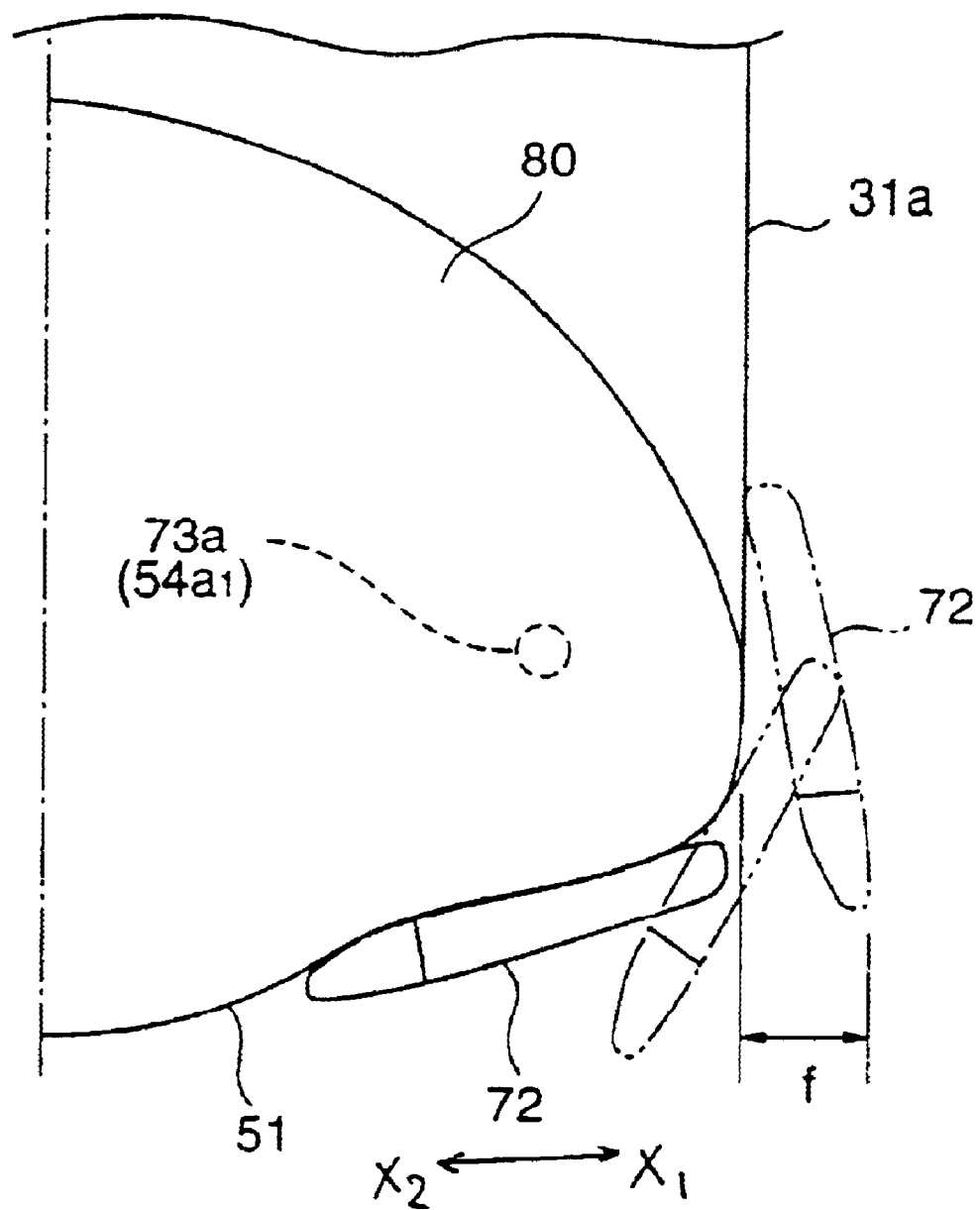
FIG. 13 is a diagram showing the movement at the time of opening and of closing the lid member.

Therefore, as shown in FIG. 13 and FIG. 14B, when opening and closing the lid member 70, the lid body 72 moves outside to the circular segment face 65 without touching the circular segment face 65.

In addition, the other lid member 71 also has the same features as the lid member 70 described above.

Figure 21:
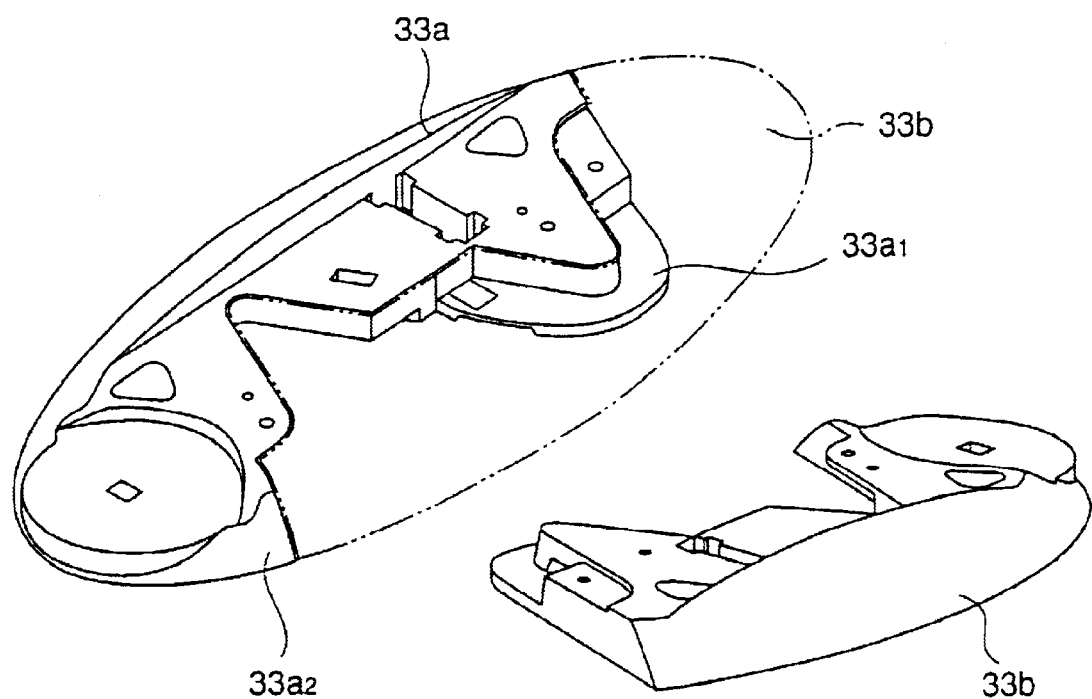
FIG. 21 is a diagram showing a pedestal.

Furthermore, the front-cover assembly 32 may also just have a single lid member 70. Next, a pedestal 33 will be explained. As shown in FIG. 21, the pedestal 33 is formed by combining a pair of half-pedestals 33a and 33b. The pair of half-pedestals 33a and 33b are separable.

Figure 22:
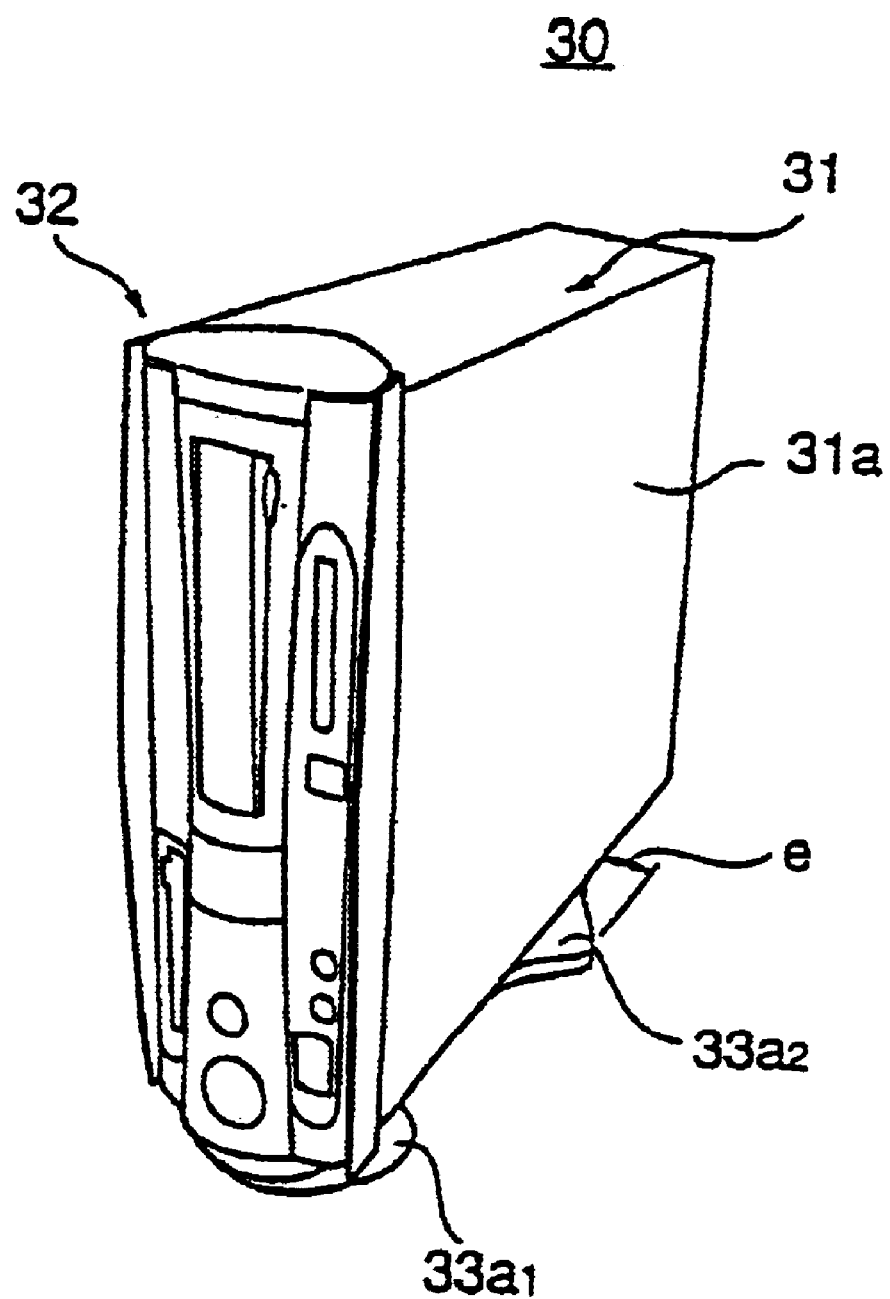
FIG. 22 is a diagram showing the information apparatus supported on the half-pedestal.

When placing the information apparatus 30 near a rim of a table with the side face 31a of the housing 31 in close proximity to, for example, a wall, the pedestal 33 is separated and the half-pedestal 33a is used as shown in FIG. 22. Of the half-pedestal 33a, portions 33a1 and 33a2 stick out in the X1 direction from the side face 31a of the housing by a dimension of e. The dimension e is slightly larger than the dimension that the lid body 72 in the opened state sticks out in the X1 direction from the right side wall part 53 of the front-cover 50.

Thus, it is possible to set the information apparatus 30 without unnecessarily leaving a large between the side face 31a of the housing 31 and the wall.

In addition, the half-pedestal 33a also sticks out in the X2 direction side as with the pedestal 33, and there is no is no danger of the information apparatus falling in the X2 direction.

The present invention not is not limited to these embodiments, but variations and modification may be made without departing from the scope of the present invention.

What is claimed is:

1. A front-cover assembly, comprising:
   a front-cover configuring a front face of an information apparatus; and a lid member provided on said front-cover so as to be turned and moved between a closed position covering said front-cover and an opened position exposing said front-cover, wherein said lid member comprises an elongated lid body and flanges, each of the flanges is provided on a respective end of said lid body;

said front-cover comprises flange supporting parts, each of the flange supporting parts supporting a respective one of said flanges thereon, and a circular segment face;

said lid member is provided with the flanges turnably supported on respective ones of said flange supporting parts of said front-cover; and said lid body does not touch said circular segment face when said lid member is opened or closed.

2. The front-cover assembly as claimed in claim 1, wherein said lid body is formed so that an orientation thereof with respect to each of said flanges is determined so that a distance between a center of a turn and a leading head in a turning direction when closing said lid member and a distance between the center of the turn and the leading head in the turning direction when opening said lid member are different.

3. A front-cover assembly, comprising:

a front-cover configuring a front face of an information apparatus; and a lid member provided on said front-cover so as to be turned and moved between a closed position covering said front-cover and an opened position exposing said front-cover, wherein said lid member comprises an elongated lid body and flanges, each of the flanges is provided on a respective end of said lid body;

said front-cover comprises flange supporting parts, each of the flange supporting parts supporting a respective one of said flanges thereon;

said lid member is provided with the flanges turnably supported on respective ones of said flange supporting parts of said front-cover, wherein each of said flanges of said lid member comprises a periphery part with a raised part thereon;

each of said flange supporting parts of said front-cover comprises a concave part; and each of said raised parts of said flanges engages a respective one of said concave parts in said closed position and in said opened position.

4. A front-cover assembly, comprising:

a front-cover configuring a front face of an information apparatus;

a lid member provided on said front-cover so as to be turned and moved between a closed, position covering said front-cover and an opened position exposing said front-cover; and caps attached to an upper face and a lower face of said front-cover, respectively, wherein said lid member comprises an elongated lid body and flanges, each of the flanges is provided on a respective end of said lid body and is formed with a turning center through-hole; and wherein said front-cover comprises flange supporting parts, each of the flange supporting parts turnably supporting a respective one of said flanges on the upper face and the lower face, respectively.

5. The front-cover assembly as claimed in claim 4, wherein:

each of said flange supporting parts comprises a shaft part that fits and passes through said turning center through-hole of the respective one of said flanges;

each of said caps comprises a fixed part to fix a leading end of a respective one of said shaft parts;

said lid member has each said turning center through-hole fit in the respective one of said shaft parts, and has each of said flanges supported by a respective one of said flange supporting parts;

each of said caps covers the respective one of said flanges; and each of said fixed parts fixes the leading end of the respective one of said shaft parts passing through said turning center through-hole of the respective one of said flanges.

6. The front-cover assembly as claimed in claim 4, wherein:

each of said caps covers a respective one of said flanges; and each of said flanges is formed so that when said lid member is turned to said opened position, a part facing said front face of said front-cover has a shape conforming with a contour of said front face of said front-cover.

7. A front-cover assembly, comprising:

a front-cover configuring a front face and a side face of an information apparatus;

a lid member provided on said front-cover so as to be turned and moved between a closed position covering the front face of said front-cover and an opened position exposing the front face of said front-cover, when moved to a side of the front-cover; and caps attached to an upper face and a lower face of said front-cover, respectively, wherein said lid member comprises an elongated lid body and flanges, each of the flanges is provided on a respective end of said lid body and is formed with a turning center through-hole, wherein said front-cover comprises flange supporting parts, each of the flange supporting parts supporting a respective one of said flanges on a respective one of the upper face and of the lower face of said front-cover;

each of said caps covers a respective one of said flanges; and each of said flanges is formed so that when said lid member is turned to said opened position, a part facing the front face of said front-cover has a shape that conforms with a contour of the front face of said front-cover, and when said lid member is turned to said closed position, a part facing the side face of said front-cover has a shape that conforms with a contour of the side face of said front-cover.

8. A front-cover assembly, comprising:

a front-cover configuring a front face of an information apparatus;

a lid member provided on said front-cover so as to be turned and moved between a closed position covering said front-cover and an opened position exposing said front-cover; and caps attached to an upper face and a lower face of said front-cover, respectively, wherein said lid member comprises an elongated lid body and flanges, each of the flanges is provided near a respective end of said lid body and is formed with a turning center through-hole;

said lid body comprises stick-out parts, respective ones of the stick-out parts sticking further outward from respective positions of each of said flanges;

said front-cover comprises flange supporting parts, each of the flange supporting parts supporting a respective one of said flanges on a respective one of the upper face and the lower face of said front-cover;

each of said caps covers a respective one of said flanges; and each of said stick-out parts covers a rim of a respective one of said caps.

9. An information apparatus, comprising:

a box-shaped housing; and a front-cover assembly comprising a front-cover configuring a front face of the information apparatus; and a lid member provided on said front-cover so as to be turned and moved between a closed position covering said front-cover and an opened position exposing said front-cover, wherein said lid member comprises an elongated lid body and flanges, each of the flanges is provided on a respective end of said lid body;

said front-cover comprises flange supporting parts, each of the flange supporting parts supporting a respective one -of said flanges thereon, and a circular segment face;

said lid member is provided with the flanges turnably supported on respective ones of said flange supporting parts of said front-cover; and said lid body does not touch said circular segment face when said lid member is opened or closed.

10. The Information apparatus as claimed in claim 9, wherein said lid body is formed so that an orientation thereof with respect to each of said flanges is determined so that a distance between a center of a turn and a leading head in a turning direction when closing said lid member and a distance between the center of the turn and the leading head in the turning direction when opening said lid member are different.

11. An information apparatus, comprising:

a box-shaped housing; and a front-cover assembly comprising a front-over configuring a front face of the information apparatus; and a lid member provided on said front-cover so as to be turned and moved between a closed position covering said front-cover and an opened position exposing said front-cover, wherein said lid member comprises an elongated lid body and flanges, each of the flanges is provided on a respective end of said lid body;

said front-cover comprises flange supporting parts, each of the flange supporting parts supporting a respective one of said flanges thereon;

said lid member is provided with the flanges turnably supported on respective ones of said flange supporting parts of said front-cover, wherein each of said flanges of said lid member comprises a periphery part with a raised part thereon;

each of said flange supporting parts of said front-cover comprises a concave part; and each of said raised parts of said flanges engages a respective one of said concave parts in said closed position and in said opened position.

12. An information apparatus, comprising:

a box-shaped housing; and a front-cover assembly comprising a front-cover configuring a front face of the information apparatus;

a lid member provided on said front-cover so as to be turned and moved between a closed position covering said front-cover and an opened position exposing said front-cover; and caps attached to an upper face and a lower face of said front-cover, respectively, wherein said lid member comprises an elongated lid body and flanges, each of the flanges is provided on a respective end of said lid body and is formed with a turning center through-hole; and wherein said front-cover comprises flange supporting parts, each of the flange supporting parts supporting a respective one of said flanges on a respective one of the upper face and of the lower face.

13. The information apparatus as claimed in claim 12, wherein:

each of said flange supporting parts comprises a shaft part that fits and passes through said turning center through-hole of the respective one of said flanges;

each of said caps comprises a fixed part to fix a leading end of a respective one of said shaft parts;

said lid member has each said turning center through-hole fit in the respective one of said shaft parts, and has each of said flanges supported by a respective one of said flange supporting parts;

each of said caps covers the respective one of said flanges; and each of said fixed parts fixes the leading end of the respective one of said shaft parts passing through said turning center through-hole of the respective one of said flanges.

14. The information apparatus as claimed in claim 12, wherein:

each of said caps covers a respective one of said flanges; and each of said flanges is formed so that when said lid member is turned to said opened position, a part facing said front face of said front-cover has a shape that conforms with a contour of said front face of said front-cover.

15. An information apparatus, comprising:

a box-shaped housing; and a front-cover assembly comprising a front-cover configuring a front face and a side face of the information apparatus;

a lid member provided on said front-cover so as to be turned and moved between a closed position covering the front face of said front-cover and an opened position exposing the front face of said front-cover, when moved to a side of the front-cover, and caps attached to an upper face and a lower face of said front-cover, respectively, wherein said lid member comprises an elongated lid body and flanges, each of the flanges is provided on a respective end of said lid body and is formed with a turning center through-hole, wherein said front-cover comprises flange supporting parts, each of the flange supporting parts supporting a respective one of said flanges on a respective one of the upper face and of the lower face;

each of said caps covers a respective one of said flanges; and each of said flanges is formed so that when said lid member is turned to said opened position, a part facing the front face of said front-cover has a shape that conforms with a contour of said front face of said front-cover, and when said lid member is turned to said closed position, a part facing the side face of said front-cover has a shape that conforms with a contour of the side face of said front-cover.

16. An information apparatus, comprising:

a box-shaped housing; and a front-cover assembly comprising a front-cover configuring a front face of the information apparatus;

a lid member provided on said front-cover so as to be turned and moved between a closed position covering said front-cover and an opened position exposing said front-cover; and caps attached to an upper face and a lower face of said front-cover, respectively, wherein said lid member comprises an elongated lid body and flanges, each of the flanges is provided near a respective end of said lid body and is formed with a turning center through-hole;

said lid body comprises stick-out parts, respective ones of the stick-out parts sticking further outward from respective positions of said flanges;

said front-cover comprises flange supporting parts, each of the flange supporting parts supporting a respective one of said flanges on a respective one of the upper face and of the lower face;

each of said caps covers a respective one of said flanges; and each of said stick-out parts covers a rim of a respective one of said caps.

17. A pedestal to support, in an upright position, an information apparatus having a box-shaped housing, and a front-cover assembly including a front-cover configuring a front face of an information apparatus, and a lid member provided on said front-cover so as to be turned and moved between a closed position covering said front-cover and an opened position exposing said front-cover, wherein said lid member includes an elongated lid body and flanges, each of the flanges is provided on a respective end of said lid body, said front-cover includes flange supporting parts, each of the flange supporting parts supporting a respective one of said flanges thereon, and said lid member is provided with the flanges on each end turnably supported on respective ones of said flange supporting parts of said front-cover, said pedestal comprising:

a pair of half-pedestals separably combined; and one of said half-pedestals is able to support said information apparatus, and when supporting the information apparatus, has a dimension of an amount that the lid body projects from a side face of the information apparatus in said opened position, or a portion projecting from the side face of the information apparatus.

18. The pedestal as claimed in claim 17, wherein said lid body is formed so that an orientation thereof with respect to each of said flanges is determined so that a distance between a center of a turn and a leading head in a turning direction when closing said lid member and a distance between the center of the turn and the leading head in the turning direction when opening said lid member are different.

19. The pedestal as claimed in claim 17, wherein: each of said flanges of said lid member comprises a periphery part with a raised part thereon;

each of said flange supporting parts of said front-cover comprises a concave part; and each of said raised parts of said flanges engages a respective one of said concave parts in said closed position and in said opened position.

20. A pedestal for supporting, in an upright position, an information apparatus having a box-shaped housing, and a front-cover assembly including a front-cover configuring a front face of an information apparatus, a lid member provided on said front-cover so as to be turned and moved between a closed position covering said front-cover and an opened position exposing said front-cover, and caps attached to an upper face and a lower face of said front-cover, respectively, wherein said lid member includes an elongated lid body and flanges, each of the flanges is provided on a respective end of said lid body and is formed with a turning center through-hole, and wherein said front-cover comprises flange supporting parts, each of the flange supporting parts supporting a respective one of said flanges on a respective one of the upper face and of the lower face, said pedestal comprising:

a pair of half-pedestals separably combined; and one of said half-pedestals is able to support said information apparatus, and when supporting the information apparatus, has a dimension of an amount that the lid body projects from a side face of the information apparatus in said opened position, or a portion projecting from the side face of the information apparatus.

21. The pedestal as claimed in claim 20, wherein: each of said flange supporting parts comprises a shaft part that fits and passes through said turning center through-hole of the respective one of said flanges;

each of said caps comprises a fixed part to fix a leading end of a respective one of said shaft parts;

said lid member has each said turning center through-hole fit in the respective one of said shaft parts, and has each of said flanges supported by a respective one of said flange supporting parts;

each of said caps covers the respective one of said flanges; and each of said fixed parts fixes the leading end of the respective one of said shaft parts passing through said turning center through-hole of the respective one of said flanges.

22. The pedestal as claimed in claim 20, wherein: each of said caps covers a respective one of said flanges; and each of said flanges is formed so that when said lid member is turned to said opened position, a part facing said front face of said front-cover has a shape conforming with a contour of said front face of said front-cover.

23. A pedestal to support, in an upright position, an information apparatus having
a box-shaped housing, and
a front-cover assembly including
a front-cover configuring a front face and a side face of an information apparatus,
a lid member provided on said front-cover so as to be turned and moved between a closed position covering the front face of said front-cover and an opened position exposing the front face of said front-cover, when moved to a side of the front-cover, and
caps attached to an upper face and a lower face of said front-cover, respectively,
wherein said lid member includes an elongated lid body and flanges, each of the flanges is provided on a respective end of said lid body and is formed with a turning center through-hole,
wherein said front-cover includes flange supporting parts, each of the flange supporting parts supporting a respective one of said flanges on a respective one of the upper face and the lower face of the front-cover,
each of said caps covers a respective one of said flanges, and
each of said flanges is formed so that when said lid member is turned to said opened position, a part facing the front face of said front-cover has a shape that conforms with a contour of the front face of said front-cover, and when said lid member is turned to said closed position, a part facing the side face of said front-cover has a shape that conforms with a contour of the side face of said front-cover, said pedestal comprising:
a pair of half-pedestals separably combined; and
one of said half-pedestals is able to support said information apparatus, and when supporting the information apparatus, has a dimension of an amount that the lid body projects from the side face of the information apparatus in said opened position, or a portion projecting from the side face of the information apparatus.

24. A pedestal to support, in an upright position, an information apparatus having
a box-shaped housing, and
a front-cover assembly including:
a front-cover configuring a front face of an information apparatus,
a lid member provided on said front-cover so as to be turned and moved between a closed position covering said front-cover and an opened position exposing said front-cover, and
caps attached to an upper face and a lower face of said front-cover, respectively,
wherein said lid member comprises an elongated lid body and flanges, each of the flanges is provided near a respective end of said lid body and is formed with a turning center through-hole;
said lid body comprises stick-out parts, respective ones of the stick out parts sticking further outward from respective positions of each of said flanges;
said front-cover comprises flange supporting parts, each of the flange supporting parts supporting a respective one of said flanges on a respective one of the upper face and the lower face of said front-cover;
each of said caps covers a respective one of said flanges; and
each of said stick-out parts covers a rim of a respective one of said caps, said pedestal comprising:
a pair of half-pedestals separably combined; and
one of said half-pedestals is able to support said information apparatus, and when supporting the information apparatus, has a dimension of an amount that the lid body projects from a side face of the information apparatus in said opened position, or a portion projecting from the side face of the information apparatus.

25. A front-cover assembly, comprising:
a front-cover to cover a front face of an information apparatus and including flange supporting parts and a circular segment face; and
one or more lid members provided on the front-cover such that each is movable between a closed position covering said front-cover and an opened position exposing said
front-cover and each of the lid members comprises an elongated lid body, and
flanges, each of the flanges being provided on a respective end of said lid body; each of the flange supporting parts of the front-cover supporting a respective one of said flanges to turnably support said lid member, wherein said lid body does not touch said circular segment face when said lid member is opened or closed.

26. An information apparatus, comprising:
a box-shaped housing; and
a front-cover assembly comprising
a front-cover to cover a front face of an information apparatus and including flange supporting parts and a circular segment face, and
one or more lid members provided on the front-cover such that each is movable between a closed position covering said front-cover and an opened position exposing said front-cover and each of the lid members comprises:
an elongated lid body; and
flanges, each of the flanges being provided on a respective end of said lid body; each of the flange supporting parts of the front-cover supporting a respective one of said flanges to turnably support said lid member, wherein said lid body does not touch said circular segment face when said lid member is opened or closed.

27. A pedestal to support, in an upright position, an information apparatus having a front-cover, a lid body turnably supported thereon to turnably move between a front face and a side face of the information apparatus, comprising:
a pair of half-pedestals separably combined; and
one of said half-pedestals is supportable of said information apparatus, and when supporting the information apparatus, projects further from the side face of the information apparatus than that of the lid body of the information apparatus projecting from the side face of the information apparatus in an opened state.

* * * * *

UNITED STATES PATENT AND TRADEMARK OFFICE
CERTIFICATE OF CORRECTION

PATENT NO. : 6,756,542 B2
DATED : June 29, 2004
INVENTOR(S) : Masaki Ishikawa et al.

It is certified that error appears in the above-identified patent and that said Letters Patent is hereby corrected as shown below:

Column 11,
Line 54, after "closed" delete ",".

Column 13,
Line 28, before "of" delete "-".

Column 17,
Line 7, before "be" delete "-".

Signed and Sealed this

Thirtieth Day of November, 2004

JON W. DUDAS
*Director of the United States Patent and Trademark Office*